US007107567B1

(12) United States Patent
LeBlanc

(10) Patent No.: US 7,107,567 B1
(45) Date of Patent: *Sep. 12, 2006

(54) ELECTRONIC DESIGN PROTECTION CIRCUIT

(75) Inventor: Marcel A. LeBlanc, Sunnyvale, CA (US)

(73) Assignee: Altera Corporation, San Jose, CA (US)

( * ) Notice: Subject to any disclaimer, the term of this patent is extended or adjusted under 35 U.S.C. 154(b) by 171 days.

This patent is subject to a terminal disclaimer.

(21) Appl. No.: 10/819,783

(22) Filed: Apr. 6, 2004

(51) Int. Cl.
G06F 17/50 (2006.01)

(52) U.S. Cl. ............... 716/17; 716/2; 716/3; 716/18
(58) Field of Classification Search ............ 716/17, 716/2, 3, 18
See application file for complete search history.

(56) References Cited

U.S. PATENT DOCUMENTS

| 6,539,525 | B1 * | 3/2003 | Kwon ............... 716/5 |
| 2003/0188275 | A1 * | 10/2003 | Meares ............ 716/4 |
| 2004/0088674 | A1 * | 5/2004 | Kato et al. ........ 716/18 |
| 2005/0071792 | A1 * | 3/2005 | Ferguson et al. ... 716/4 |

OTHER PUBLICATIONS

Adi et al., "A Protection Mechanism for Intellectual Property Rights (IPR) in FPGA Design", Proceedings of the 2003 10th IEEE International Conference on Electronics, Circuits and Systems, vol. 1, Dec. 14, 2003, pp. 92-95.*
Release of Quartus II 3.0 EDA software by Altera Corporation—Jun. 23, 2003 [Some features described in two internal documents: Gopalsamy, "Simgen—Sgate Level Simulation Netlist Generator," version 1.1, 8 Pages; and Molson, "Simgen Requirements," version 1.0, 11 Pages].
Bain, "Method for Creation of Secure Simulation Models," U.S. Appl. No. 10/646,193, filed Aug. 22, 2003, 43 Pages.

* cited by examiner

Primary Examiner—Phallaka Kik
(74) Attorney, Agent, or Firm—Beyer Weaver & Thomas, LLP

(57) ABSTRACT

Protected electronic designs permit appropriate simulation and testing of the electronic design in a simulation environment, while preventing a correctly operating unauthorized implementation of the electronic design in a hardware environment such as a programmable device. An unprotected version of the simulation version of an electronic design is augmented by adding protection circuitry to the unprotected version to create a protected version of the electronic design, which operates correctly in a simulation environment but which fails to operate correctly in a hardware environment. In some embodiments of the present invention, a separate programming version which does not incorporate the protection circuitry of the simulation version may also be provided for licensed/authorized users of the electronic design, which may be an IP core or other design.

40 Claims, 14 Drawing Sheets

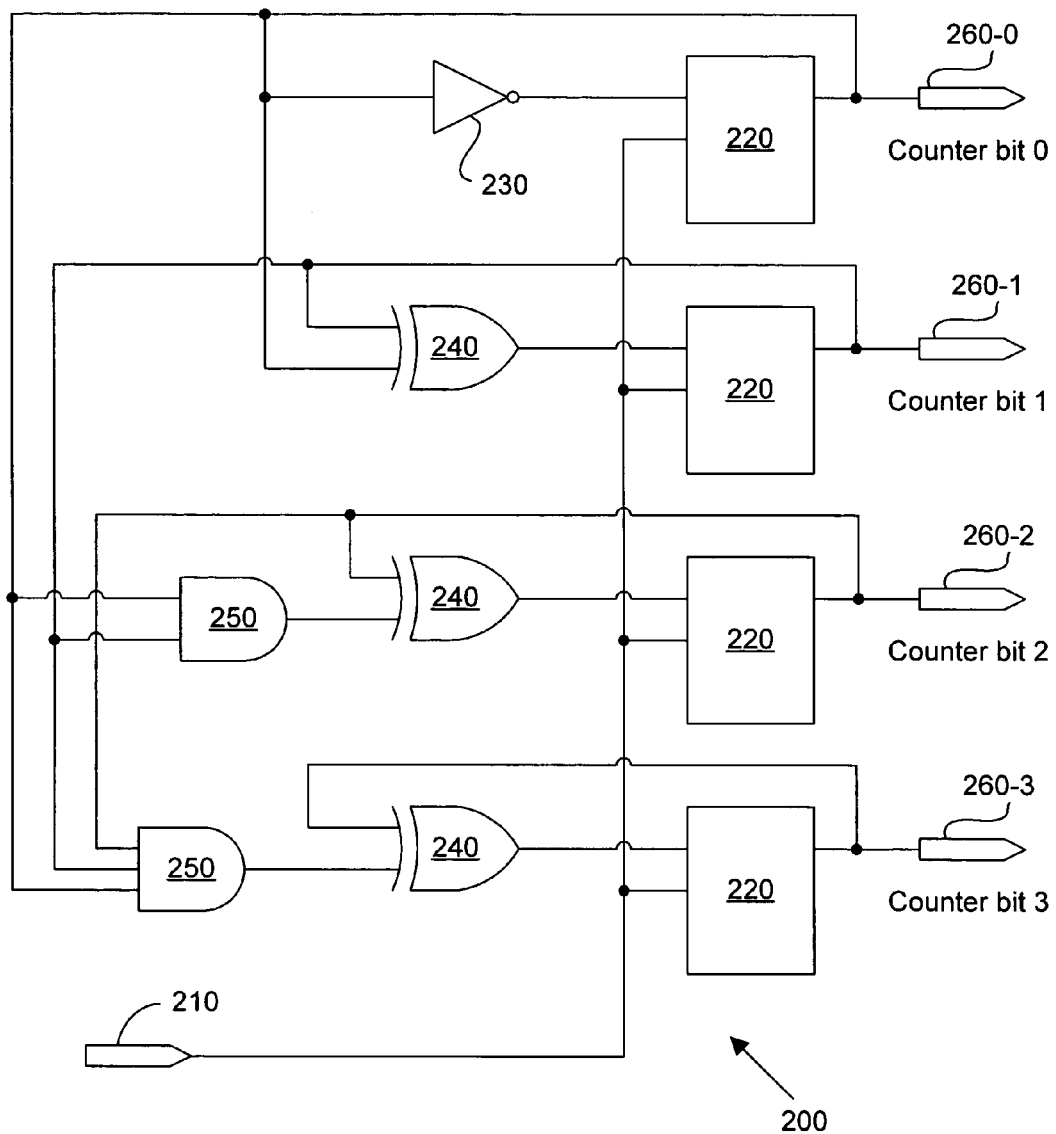
*Figure 2A - Unprotected version of electronic design
(Prior Art)*

Outputs of unprotected version of counter 200 of Figure 2A in both simulation and hardware environments.

Outputs of protected version of counter 300 in Figure 3A in simulation environment.

Outputs of protected version of counter 300 of Figure 3A in hardware environment.

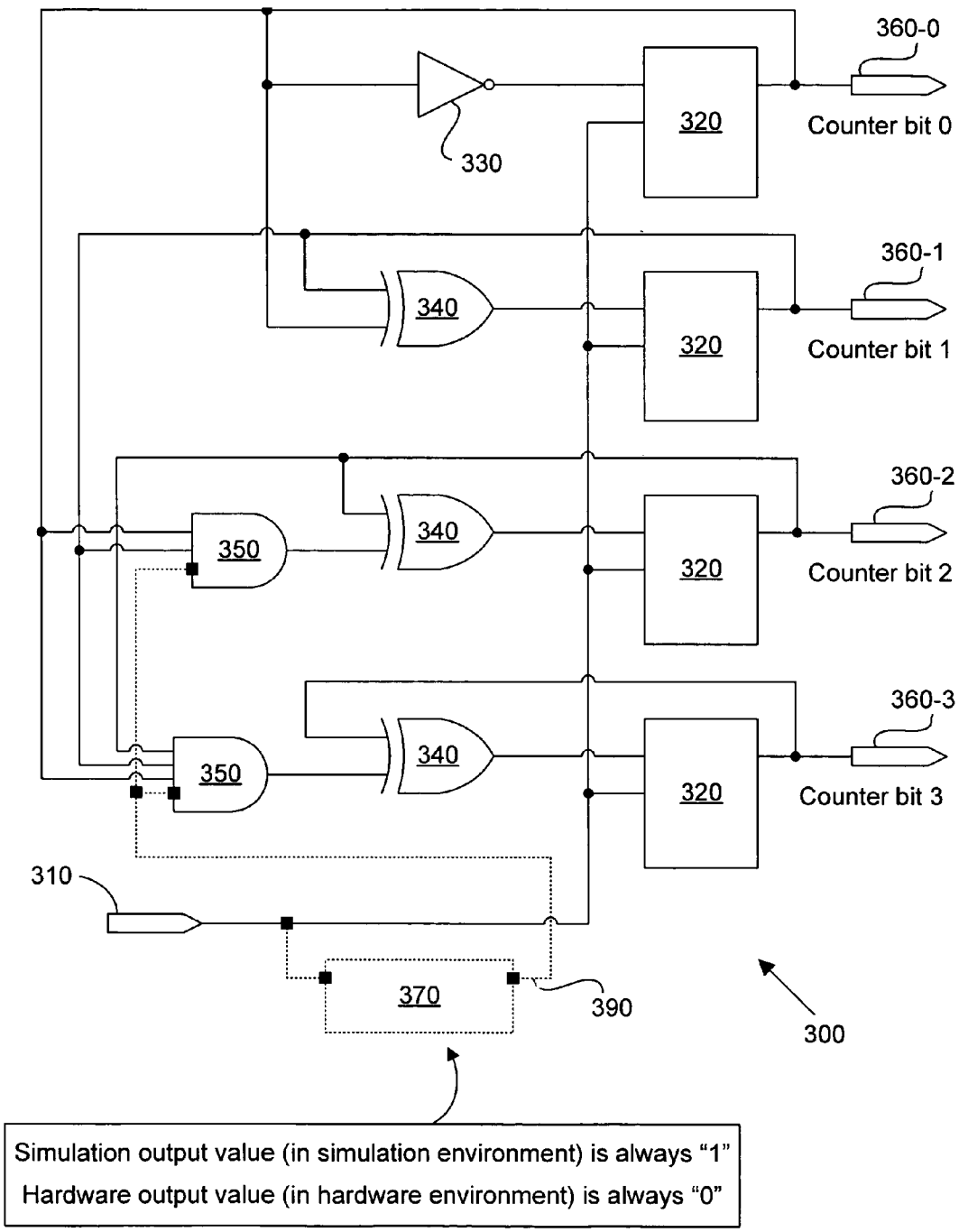
*Figure 3A - Protected version of electronic design*

Table 5-1

| Clock | 520 output | 530 output | 540 output | 550 output | 590 output |
|---|---|---|---|---|---|
| 0 | 1 | 0 | 1 | 1 | 1 |
| 1 | 0 | 1 | 1 | 1 | 1 |
| 2 | 1 | 0 | 1 | 1 | 1 |
| 3 | 0 | 1 | 1 | 1 | 1 |
| 4 | 1 | 0 | 1 | 1 | 1 |

Table 5-2

| Clock | 520 output | 530 output | 540 output | 550 output | 590 output |
|---|---|---|---|---|---|
| 0 | 0 | 0 | 0 | 0 | 0 |
| 1 | 0 | 0 | 0 | 0 | 0 |
| 2 | 0 | 0 | 0 | 0 | 0 |

ELECTRONIC DESIGN PROTECTION CIRCUIT

BACKGROUND OF THE INVENTION

1. Field of the Invention

This invention relates generally to methods, machine readable media and apparatus for protecting intellectual property ("IP") that is available to users for evaluation and preventing unauthorized use of such IP in hardware or otherwise after synthesis. More specifically, this invention relates to augmenting electronic designs so that they function properly in a simulation environment, but do not operate correctly in a hardware environment, such as implementation in a programmable device.

2. Description of Related Art

Electronic design automation ("EDA") systems have become integral to the development of electronic designs for implementation in devices such as programmable logic devices (PLDs) and field programmable gate arrays (FPGAs). An EDA system provides various tools that receive and convert a user's high-level representation of an electronic design to a form suitable for programming the programmable device. EDA systems may include tools for design entry, compilation, synthesis, mapping, verification, generating a programming file, etc. In addition, EDA systems typically include a simulation tool for confirming that the electronic design is likely to operate as intended. The design of even the simplest of these devices typically involves generation of a high level design, logic simulation, generation of a network, timing simulation, etc.

During the process of creating an electronic design, a user may employ one or more reusable IP cores. These are predefined and preverified functional blocks for performing well-defined tasks that may be incorporated into a user's electronic design. In some cases, they may define an entire electronic design itself. Frequently, they are configurable by a user who can specify one or more parameters appropriate for the desired application. They are designed to work well with existing EDA tools so that users can easily input them into their electronic designs. IP cores may be viewed broadly to include "megacores," "megafunctions" and other predefined logic blocks for implementation in programmable devices. Megacores define large complex functional blocks such as microprocessors and sophisticated communications blocks such as a block for terminating a trunk protocol on a fiber optic link. Megafunctions define smaller functional blocks such as a DSP filter, multiplier, or FIFO memory. Collections, or libraries of simple parameterized megafunctions are available. One example is the library of parameterized modules ("LPM") developed under the guidance of the EDIF association. A variety of these IP cores are available from Altera Corporation of San Jose, Calif.

In the modern EDA environment, IP core vendors typically allow users to evaluate the IP cores without charge or authorization (for example, a license) before deciding whether to implement them into a final design. Therefore, the vendors provide their cores in a form that allows both evaluation and compilation to a final hardware programming file. Evaluation requires simulation on one of the many available EDA simulation tools. Therefore an IP core vendor typically provides a customer with two forms of a core: (1) a programming version in the form of source code and/or synthesized netlist for compiling the IP core to a programming file using a particular EDA tool (e.g., Quartus available from Altera Corporation of San Jose, Calif.); and (2) a simulation version that can be executed on a specific third party simulator to evaluate the IP core.

While a user may evaluate one or more IP cores for free in a simulation environment, a user must have authorization from the IP owner to implement an IP core in a hardware environment such as a target hardware device. Vendors must be concerned with the possibility of unauthorized use of their IP cores, which may occur in various ways. In one example of unauthorized use, the user converts the programming version of the IP core to a programming file and then programs hardware devices without a license from the IP core vendor. In another example, a user ports an electronic design containing the IP core to a competitor's hardware platform.

In order to address the issue of unauthorized use of IP cores in hardware environments, both the programming version and the simulation version of a core must be protected. One approach to protecting the programming version involves encrypting the IP core's source code and/or synthesized netlist. Another approach is to verify the existence of a licensing file before generating a programming file for the target hardware device. These approaches do a good job of protecting the programming version of an IP core from unauthorized use. However, they are not practical for protecting the simulation version of the core.

While the programming version can be designed for use with a single EDA platform (for example, Altera's Quartus), the simulation version typically must work with many different simulation tools. For example, Quartus and other EDA platforms work with an array of different simulation tools, each of which may be provided by a different vendor. Examples of simulation tools include ModelSim by Mentor Graphics Corp. (Wilsonville, Oreg.); Verilog-XL and NC-Verilog simulators by Cadence Design Systems, Inc. (San Jose, Calif.); and VCS simulator by Synopsys, Inc. (Mountain View, Calif.).

Because the simulation version of an IP core must work with a variety of different simulation tools, security features must work with each tool. One could provide a simple source code version of the IP core for simulation (for example, Verilog), which could be compiled to the appropriate machine code for any of a number of different simulators. But this approach provides little, if any, security. An unscrupulous user could modify the source slightly to allow compilation to a programming file that would circumvent the licensing requirements of the IP vendor.

To improve security, a vendor could provide precompiled versions of the simulation version for each of the available simulation tools on the market. Unfortunately, this is not practical. The vendor would need to maintain updated versions of the IP for each of the third party simulation tools, which can run on various computer platforms, thus requiring a separate compiled version of the IP for each combination of simulator and hardware platform. The problem is exacerbated by the myriad of configuration possibilities for each IP core (which usually depend on user settings). The IP vendor might have to provide a separate compiled version of the core for each potential configurations (on each of the simulator-hardware combination). Consequently, it would be unfeasible for a vendor to maintain a full range of simulation versions.

Another approach to providing simulation versions gives the actual source code of the simulation version to trusted users only (for example, employees of large companies known to maintain close control over the IP). Unfortunately, this limits the market available to IP vendors. In yet another approach, the IP core vendor provides an equivalent behavioral model of the simulation version. A behavioral model cannot be compiled to produce a working program file for implementing the design on hardware devices. Unfortunately, this approach has its drawbacks in that it usually will not produce a model that is cycle and bit accurate.

There are some EDA system tools such as "VIP" (Visual IP available from Summit Design (Burlington, Mass.)) that attempt to address the problem of making secure simulation versions of IP cores. VIP can generate a secure simulator-independent simulation version, but requires use of various special purpose VIP proprietary tools, such as translation programs and adaptors, which must be purchased by the user. Obviously, an IP vendor would prefer not to force potential customers to purchase third-party tools that protect the vendor. Further, VIP-generated simulation versions are generally large, slow, and require PLI/FLI setup that is difficult to use and is time consuming.

A typical design cycle (using, for example, Altera's OpenCore technology) is shown in FIG. 1A. A designer creates an initial block diagram 110 and subsequently identifies and evaluates (for example, in terms of functionality and the range of parameterization) potential IP cores and/or megafunctions available for use in the anticipated system 120. The designer then can obtain authorized simulation versions of any IP to be used from the IP's owner or agent 130. After finding the appropriate megafunction(s), the designer generates (typically with the assistance of simulation generation software, such as Altera's SimGen) a simulation version of the user's designed logic 140. The user may then test the designed logic in a simulation environment by simulating performance 150 within the anticipated circuitry and system.

Once simulation and validation are completed, the IP used can be synthesized for use in hardware 160. To incorporate a design into a programmable device, the design that has been simulated needs to be synthesized to generate a design that can be implemented in a programmable device. After implementing the designed logic in hardware, the designed logic may then be tested in the hardware environment 170.

The goal of many IP owners has been to create designs and release them to customers in a form that allows customers to simulate a design using a software model (for example, a Verilog or VHDL model in EDA simulators) without telling customers too much about what the core is or that can be used in an EDA synthesis tool. One option has been to create model that is synthesizable, but not desirable from a performance perspective in a hardware device (for example, a design that runs too slowly when synthesized and implemented in a hardware device).

Another approach has been to precompile a design in a form that cannot be reverse engineered and is not human readable. In these situations, the original IP is precompiled by a trusted party, such as the IP owner, for use in simulation tools only. One drawback to this method is that it is very time consuming for the party doing the conversion and it is inconvenient for would be users of the design(s). This also can result in designs that are very cumbersome for customers to use and change, though some models can be parameterized to allow changes by customer.

Parties also have started using simulation generators, which are software tools that synthesize original IP into simulatable models. Such simulation generators obfuscate and "flatten" the IP, making it difficult, though not impossible, for humans to read and decipher the design. For example, during obfuscation, clues for understanding the model (for example, structures, names, node names, register names, function names) are thrown away and are replaced with machine-generated names that are random terms without any connection to functions, etc. This basically is a netlist dump in protected form that is useful for simulation, but is only marginally useful for synthesizing the design. Flattening the IP involves altering and/or removing boundaries and other demarcations that likewise can assist in understanding the operation and structure of programmed logic.

A simulation generator does not change the model itself. Simulation generators do not perform any transformations on an original design. Instead, the simulation design is a direct copy of the original design that has been obfuscated, flattened and had unnecessary parts and components reduced and/or eliminated. Despite these efforts to protect the interests of IP owners, some users can still synthesize designs and implement them on hardware devices, without authority from the IP owners.

Techniques that permit thorough simulation and other development of digital systems and devices by designers and users, while making unauthorized synthesis and operation of these designs in a hardware environment more difficult would protect the proprietary interests of the owners of the intellectual property incorporated in such systems and devices and would represent a significant advancement in the art.

BRIEF SUMMARY OF THE INVENTION

The present invention provides protected electronic designs that permit appropriate simulation and testing of the electronic design in a simulation environment, while preventing a correctly operating unauthorized implementation of the electronic design in a hardware environment such as a programmable device. An unprotected version of the simulation version of an electronic design is augmented by adding protection circuitry to the unprotected version to create a protected version of the electronic design.

In some embodiments of the present invention, a separate programming version may also be available for licensed/authorized users of the electronic design, which may be an IP core or other design. The programming version of the electronic design may be limited to use in user designed logic developed using a specified EDA platform, and may be protected by encryption or other security measures to prevent unauthorized access to the programming version of the electronic design.

The protected simulation version of the electronic design may be available to users to implement in user designed logic for simulation purposes. If the protected version is synthesized and implemented in hardware, the electronic design will fail to operate correctly.

The protection circuitry always outputs a simulation output value in a simulation environment and always outputs a hardware output value that is different from the simulation output value in a hardware environment. In some embodiments, exploiting the fact that registers can be initialized to "1" or "0" in simulation, but only to "0" in a hardware environment, the simulation output value of the protection circuitry is always "1" while the hardware output value is always "0". In one embodiment, the protection circuitry is a single flip-flop that has a simulation initialization value of "1" and a hardware initialization value of "0". An appropriate output of the protection circuitry is connected to the unprotected electronic design to create a protected version of the electronic design.

In other embodiments of the invention, the protection circuitry is a shift register. In one such embodiment, two flip-flops are used with feedback signals to create alternating "01" and "10" inputs to an XOR gate in a simulation environment, so that the XOR gate output is always "1" in the simulation environment. Conversely, the two flip-flops generate a continuous "00" input pair to the XOR gate in a hardware environment, so that the XOR gate output is always "0" in a hardware environment. Again, an appropriate output of the protection circuitry is connected to the unprotected electronic design to create a protected version of the electronic design.

Methods of producing the protected version of the electronic design include receiving the unprotected version of the electronic design and adding the protection circuitry to produce a protected version of the electronic design. Adding the protection circuitry may include identifying existing one or more locations in the unprotected version of the electronic design and connecting the appropriate output of the protection circuitry to those locations. In some cases, logic may be added to connect the protection circuitry to the unprotected version of the electronic design.

BRIEF DESCRIPTION OF THE SEVERAL VIEWS OF THE DRAWING

The present invention will be readily understood by the following detailed description in conjunction with the accompanying drawings, wherein like reference numerals designate like structural elements, and in which:

FIG. 2A is a schematic logic diagram of a prior art 4-bit counter.

FIG. 3A is a schematic diagram of protected logic in the form of a 4-bit counter designed logic and protection circuitry according to one embodiment of the present invention.

DETAILED DESCRIPTION OF THE INVENTION

Figure 1A:
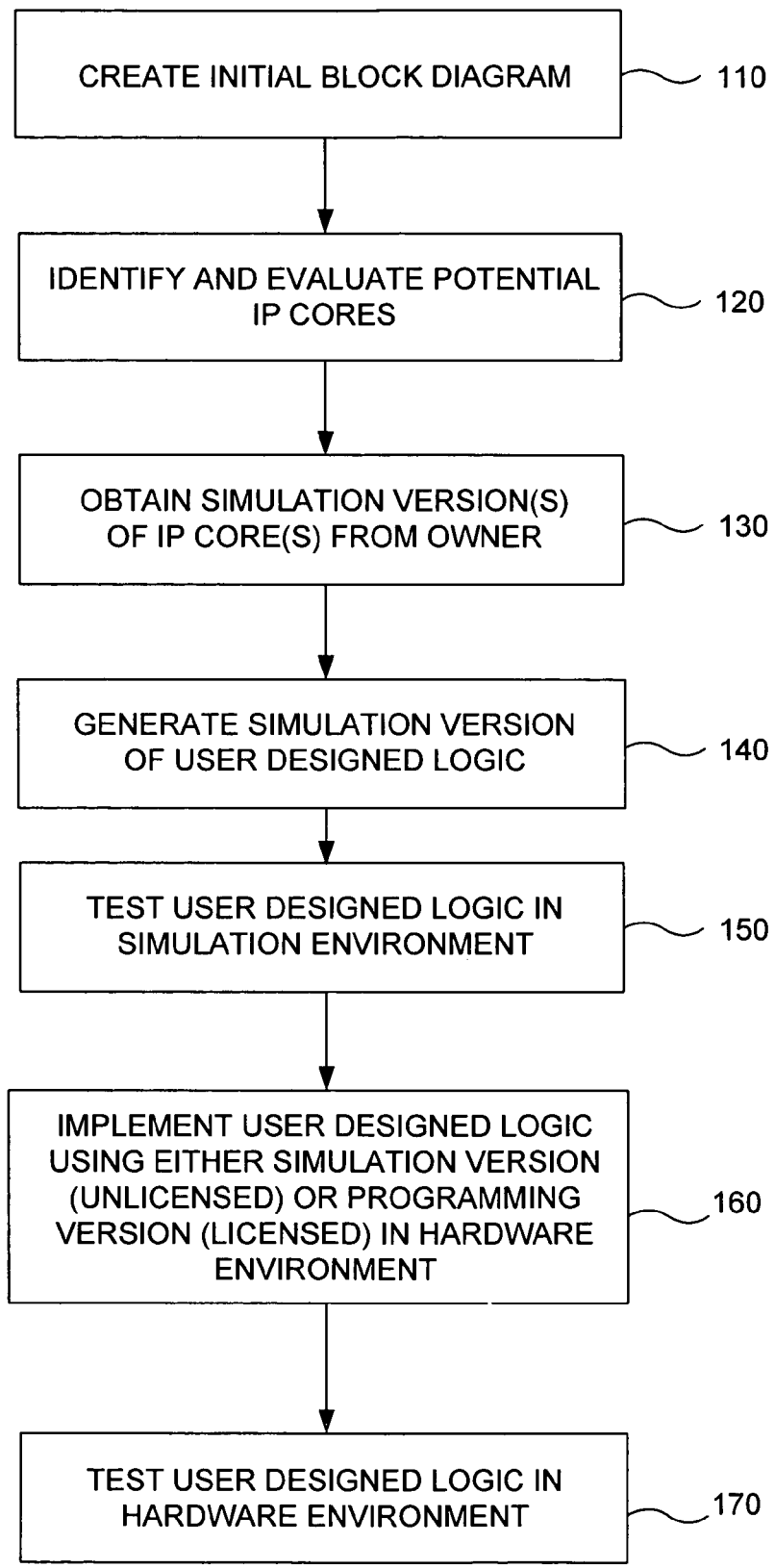
FIG. 1A is a block diagram showing a prior art design cycle for a digital system, including the simulation and synthesis of some or all of a design to be implemented.

The following detailed description of the invention will refer to several embodiments of the invention, but is not limited to such embodiments. The detailed description is intended only to be illustrative. Those skilled in the art will readily appreciate that the detailed description given herein with respect to the Figures is provided for explanatory purposes as the invention extends beyond these limited embodiments.

The invention relates to electronic design automation (EDA) systems that employ protection circuitry to create secure simulation versions that can be used in the evaluation of IP cores and other electronic designs available for simulation. Systems and methods of this invention are designed to insert protection circuitry in high-level and/or intermediate-level representations of electronic designs (for example, IP cores) to generate simulation versions that can run on a wide range of simulators and computers. These simulation versions accurately simulate the IP core or other electronic design to allow evaluation, but cannot be converted to a correctly operating implementation of the electronic design in a hardware environment.

In many embodiments, the simulation version is provided in a standard, non-proprietary format that can be compiled to execute on any of a number of computer/processor types (Pentium, SPARC, etc.) running any of a number of different simulators. Hence, the IP provider need only provide a single version (or a limited number of versions) of the model. This is possible because the simulation version of the IP core is written in a high-level language such as a hardware description language (Verilog, VHDL, AHDL, etc.). Generally, the language may be any that is accepted by most commercially important simulators on the market. Thus, the IP vendor need not provide separate evaluation versions of its IP core for multiple combinations of computer/simulator/configuration state.

This invention solves the problem of providing such a generic, high-level representation of the IP core, while prohibiting unauthorized conversion of the IP to a correctly operating hardware implementation that could be deployed in a commercially viable product. As indicated, this is accomplished by adding what is referred to herein as "protection" circuitry to the unprotected high-level simulation version of the IP core.

In many cases, it is desirable to provide the IP core in two versions: (a) a high-level simulation version with protection circuitry as described, and (b) a programming version of the IP that can be used on only one or a limited number of EDA design and programming tools. This second version (sometimes referred to herein as the "programming version") is intended for implementation in final hardware designs created by legitimate, licensed users. Because the programming version is directed to a particular EDA platform (or a small group of them), it can include safeguards that are unavailable, impractical and/or undesirable for the simulation version. These safeguards include encryption in a format recognized only by the intended EDA tool (for example, Altera's Quartus), and mechanisms to block generation of a hardware programming file unless a license file is detected. Thus, the programming version of the IP core typically is provided to authorized users as an encrypted, compilation-ready netlist. During the design phase, a user may employ the simulation version to evaluate the suitability of the IP core for his or her design.

As described in more detail below, the protection circuitry renders a hardware implementation of the protected version of the simulation version useless. In addition, the protection circuitry does not impact the simulation result. In other words, the protection circuitry is transparent from the global perspective of the simulator. The simulation result is substantially the same with or without the protection circuitry, meaning that the simulation results are a valid simulated representation for evaluation of the electronic design's performance in a hardware environment. As will be obvious to those skilled in the art after considering the present invention, this can be accomplished using a number of different techniques. In addition, the protection circuitry is generally difficult to identify and remove from the simulation version. In particular, some embodiments resist removal by conventional tools such as synthesizers and logic optimization routines.

Generally, the protection circuitry is automatically inserted in an "unprotected" version of an electronic design (for example, an IP core) by the systems and methods of this invention, which are implemented as software programs (or combinations of hardware and software). Generally, a protection system of this invention identifies existing locations within the electronic design for inserting the added circuitry. In some embodiments of the present invention, where required logic and/or other structure(s) do not already exist in the unprotected electronic design, logic and/or structure may be added (for example, in the form of AND and/or OR gates). The protection circuitry and electronic design locations used may include logic that is not typically or easily removed by a synthesizer. Depending on the original circuitry being protected, a single location may be used or multiple locations may be used for adding the protection circuitry.

As indicated, this invention is particularly valuable for protecting IP cores, as these are widely marketed and must be evaluated on a wide variety of simulation tools. More generally, however, the invention can be employed to protect any type of electronic design (of which IP cores are but one example).

The term "electronic design" generally refers to the logical structure of an electronic device such as an integrated circuit or a portion of the device. It may be implemented in hardware (sometimes referred to herein generically as a "target hardware device"). During the design and development effort, an electronic design may exist in various states or stages. These may include a high level Boolean representation (encoded in a hardware design language for example), a schematic or circuit representation, or any other form representing the logical arrangement of a device. In addition to the circuit structure and behavioral descriptions, the electronic design may specify other details such as floor-plan constraints, waveform constraints, timing constraints, fitting constraints, etc. At the gate level, it may exist as a netlist (whether synthesized or not) prior to placement on a target hardware device. Alternatively, it may include completed place and route assignments.

As used herein, an "IP core" is a predefined electronic design available to a user as a functional block for use alone or in conjunction with other components of a larger electronic design. During the design phase, a user inserts a selected IP core into his or her design, makes any needed connections to other features of a larger electronic design, parameterizes the IP core, and compiles the entire design per normal procedures. The resulting compiled electronic design includes the off-the-shelf IP core, parameterized as specified by the user, and possibly integrated with other components of the design in a compiled form. This design can then be used to program a programmable device (for example, an FPGA or PLD) or layout an application specific integrated circuit (ASIC), for example. In the context of this invention, the term "IP core" embodies various predefined off-the-shelf functional blocks used in the EDA industry. Examples include cores, megafunctions, macrofunctions, and the like.

The implemented design associated with an IP core will be specified by various parameters. The user may set certain of these parameters for his or her design. For example, the user may set a buffer functional block to a buffer depth of 16 words and a buffer width of 32 bits. Typical examples of other parameters include bus widths, buffer sizes, memory array dimensions, etc. Various tools are available for the user to insert parameter values specific to his or her design. One example is the MegaWizard tool available from Altera Corporation and described in U.S. Pat. No. 6,401,230.

For context, the electronic design automation process may be divided, roughly, into four stages: (1) Design Entry; (2) Design Compilation; (3) Design Verification; and (4) Device Programming. The design entry stage normally involves a user (for example, a designer) entering a high level behavioral or functional representation of an electronic design. Design entry by the user may be done using different methods, two of which are graphical design entry (such as a schematic design editor) and text design entry (such as hardware description language). In many EDA systems, the output of the design entry stage is a netlist that is derived from the design as entered by the user. Frequently, the netlist is produced from a Hardware Design Language (HDL) representation of the design. Often that representation is provided in Register Transfer Level (RTL), which specifies some level of hardware features.

In the context of this invention, a user may enter a design comprising an IP core. The core is entered as a block defining a pre-constructed netlist, for example. This would be the programming version of the IP core described above, as opposed to the simulation version. As indicated, the IP core will typically include a license file to identify authorized users.

After the electronic design (comprising one or more IP cores) has been fully entered, it may be compiled to produce a configuration file describing the programming of a hardware device. In one embodiment, this requires confirmation that the user's system has a valid license file or other authorization for use of any IP cores incorporated in the design.

During the design verification stage, the design is tested by performing functional and/or timing simulations. This makes use of the simulation version component of the IP core. It should be noted that the design verification stage may be done at anytime throughout the electronic design process and may go through several iterations before a final electronic design is achieved. Finally, the device programming stage entails programming the hardware device with a final configuration file.

Figure 1B:
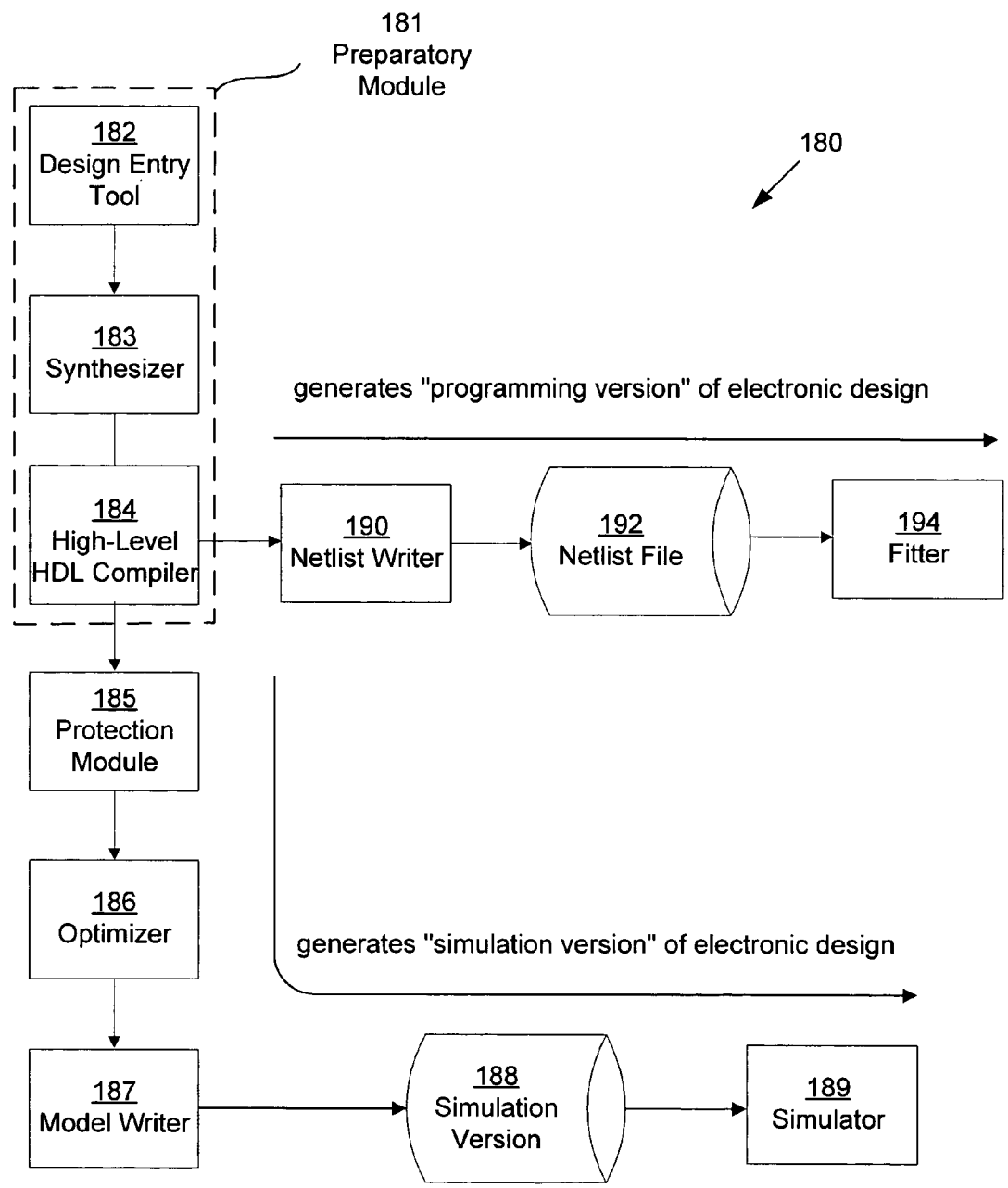
FIG. 1B is a block diagram showing a block diagram of a protection system and design flow according to one embodiment of the present invention.

FIG. 1B is a block diagram of a system 180 for modifying an electronic design (such as an IP core, which is discussed as specific example of an electronic design herein) with protection circuitry according to one embodiment of the present invention. The system 180 may be used to perform various steps of the design cycle illustrated in FIG. 1A. A preparatory module 181 receives an unprotected version of an electronic design and performs some preliminary processing. The IP core developer provides the electronic design in HDL or a similarly high-level representation (block 182). Generally, the output of module 181 (provided at block 184) is a high-level and/or intermediate-level, partially compiled version of an electronic design suitable as a starting point for both the simulation version and the programming version. In the specific example of FIG. 1B, it is provided as a behavioral, partially HDL representation.

The module 181 includes a design entry tool 182, a synthesizer 183, and a high-level compiler 184. Design entry tool 182 may be any tool that facilitates high-level entry of the electronic design. For example, depending on the form of entry the user chooses, design entry tool 182 may be either text based (for example, HDL such as Verilog, VHDL, RTL) or graphic based (for example, schematic) or a combination of both text and graphic based. Synthesizer 183 synthesizes the high-level representation of the electronic design. In general, synthesizers produce an equivalent representation of the electronic design entered through design entry tool 182. The equivalent representation is often in a resultant source code format. Any suitable synthesizer may be used. In one embodiment, synthesizer 183 is the Quartus Native Synthesis (QNS) tool available from Altera Corporation. Other suitable synthesizers include the LeonardoSpectrum product available from Mentor Graphics of Wilsonville, Oreg. and the Synplify product available from Synplicity of Sunnyvale, Calif. Finally, high-level compiler 184 provides a relatively high level compilation of the electronic design. The resulting compiled code is typically a behavioral representation of the electronic design, but not a physical representation. It is preferably in an HDL neutral format. That is, the format is neither VHDL, Verilog, nor any other widely used HDL format. In one embodiment, high-level compiler 184 can be incorporated into part of the Quartus II version 3.0 tool available from Altera Corporation.

Alternative embodiments may dispense with one or both of synthesizer 183 and compiler 184. As long as a high-level and/or intermediate-level representation (for example, an HDL or RTL representation) of the IP core is available for protection, synthesis and partial compilation are not strictly required.

As shown in FIG. 1B, the output of preparatory module 181 is made available to both a netlist writer 190 and a protection module 185. These present the paths to the two separate versions of an IP core. The path from netlist writer 190 produces the programming file for hardware implementation of the design while the path from protection module 185 produces the simulation version.

Focusing first on the simulation version path, protection module 185 produces protection circuitry in the unprotected version of the core provided by module 181. Protection module 185 generally performs the functions of scanning the core to identify connection locations and connecting the protection circuitry to the electronic design. These functions may be implemented, for example, as a scanning module that identifies one or more locations for connecting the protection circuitry to the unprotected version of the electronic design and a connection module for connecting the protection circuitry to the unprotected version of the electronic design. The scanning and connecting functions may be performed separately, sometimes with user intervention, or in a single automated global operation.

Referring again to FIG. 1B, an optimizer 186 can optionally be provided. Optimizer 186 receives the protected version of the electronic design (IP core) from protection module 185 and optimizes it to effectively merge or blend portions of the affected region(s) with portions of the unaffected region(s). Optimizing lessens the likelihood that a user will identify and/or remove the protection circuitry from the simulation version of the electronic design, thereby further protecting the electronic design from unauthorized usage. In general, any widely used optimizer may be employed. Examples include the LeonardoSpectrum product available from Mentor Graphics of Wilsonville, Oreg. and the Synplify product available from Synplicity of Sunnyvale, Calif.

After the protected version of the electronic design is generated by module 185 and optionally optimized by module 186, it may be in a form suitable for immediate use. In some cases, however, further refinement may be required. In one such case, the compiler 184 reduced the electronic design to a language neutral format. Thus, before the protected design can run on third party simulators, it must be converted back to a standard format such as Verilog or VHDL. For this purpose, a model writer 187 is provided. In one embodiment, model writer 187 acts as a neutral translation utility, which is a feature that can be incorporated into Quartus II release 3.0. It converts the protected version of the electronic design to a simulation version 188 with a standard format usable by a variety of simulators 189 and computational platforms. Thus, an advantage of model writer 187 is that it renders electronic designs that are represented originally or intermediately in a format not readily available for different simulators compatible with simulators having specific format requirements. Another advantage is that model writer 187 allows a designer (for example, the original IP core designer) to choose between different formats for entering the electronic design whether or not the format chosen is readily available for different simulators 189 to use.

As shown in FIG. 1B, the path to a programming version of the IP core begins with netlist writer 190. Any conventional netlist writer that can act on the output of module 181 may be employed. Netlist writer 190 creates a netlist file 192 that can be in any conventional format (for example, .vqm). Thereafter, a fitter 194 performs place and route operations on the IP core. Note that fitter 194 performs these operations on an unprotected version of the electronic design.

Note that programming version of the IP core can be provided in a variety of formats. It is not important in the context of this invention that the programming version be in the form of HDL, a netlist, a compiled (place and route) version, etc. All that it is required is that the protection circuitry not be present and that the unprotected version of the electronic design be compatible with an intended EDA environment.

It is frequently desirable that the programming version possesses some measure of security. To this end, it may be encrypted prior to distribution. It may also include some IP identifier that will require confirmation of a license file prior to conversion to a programming file. Further, it may include a signature or watermark to allow detection in hardware designs. These features may be added at any stage in the path to a programming version.

From the above discussion, the meanings of certain relevant terms should be reasonably clear. However, to further illuminate certain concepts pertinent to this invention, the following definitions are provided. These definitions are provided to assist in understanding the concepts presented in the specification. They do not necessarily limit the scope of this invention.

A "netlist" is used to describe the functionality and connectivity of a digital circuit design that can be implemented on a programmable logic device or other target hardware device. The netlist is represented as a hierarchical collection of gates, state machines, high level constructs such as counters or adders, or any other means of defining a collection of outputs based on a collection of inputs. The nodes of the netlist (gates, state machines, etc.) are connected together via nets. Each of these nets is associated with a named digital signal. A netlist may be synthesized to remove redundant logic, simplify the gate layout provided by a user, etc.

When in the form of a netlist (such as a synthesized netlist), an electronic design may be divided into "logic cells" (sometimes called "hardware cells" herein) representing various logic functions within the electronic design. During compilation, these logic cells are mapped onto physical structures known as "logic elements" which reside on the target hardware device. Logic elements may include various types of programmable logic including look up tables (LUTs), product terms, memory blocks, dedicated arithmetic elements such as multipliers and accumulators, etc. The criteria for mapping gates or other design features into logic cells are a result of the requirement that the resulting logic cell must fit into one logic element. An example of a logic cell is a collection of gates (connected in some way and implemented in a look-up table) combined with a register and configured to implement a multiplexer.

A "compiler" takes a high level representation (for example, a netlist) as an input and, using a component database, puts the information necessary for layout (hardware implementation) and sometimes verification and/or simulation into an object file or files. A simulator takes the object file(s) and simulation versions, and generates a set of simulation results, acting on instructions, initial conditions, and input signal values provided to it either in the form of a file or user input. When compilation is complete, a target hardware device is programmed (or otherwise constructed) with the compiled design.

In the context of this invention, a target hardware device is any hardware device on which an EDA designed device is implemented. A more specific description of a hardware device and its possible structure and features is found below. It may include memory elements, registers, and/or dedicated functions such as processor cores and DSP blocks. The logic elements, memory elements, and registers are typically the fundamental elements of the hardware device's architecture on which different electronic design components can be defined. These elements may be grouped into blocks such that each discrete element is associated with a block (or other arbitrary containment entity). There may be higher-level organization in the device such that logic blocks are grouped into rows or some other arbitrary entity.

Target hardware devices may be custom integrated circuits (for example, ASICs), custom configurations for programmable integrated circuits, or general purpose, mass-produced integrated circuits. Many embodiments of the invention employ programmable devices such as programmable logic devices (PLDs) that are programmable by a user to produce a custom design for that user. Programmable logic devices are integrated circuits that may be programmed to perform a desired function and include programmable logic arrays (PLAs), programmable array logic (PAL), field programmable gate arrays (FPGAs), complex programmable logic devices (CPLDs), and a wide variety of other logic and memory devices that may be programmed. Altera's Stratix™ devices are examples of PLD target hardware devices. They contain logic elements, memory, and dedicated parallel multiplier circuitry (denoted DSP Blocks).

The present invention provides methods, circuits and/or structures that can be inserted simply into an unprotected simulation version of an electronic design to create a protected simulation version that allows complete testing and evaluation of a design in a simulation environment, while preventing the design from operating properly in a hardware environment after synthesis of the design. The added protection circuitry is generally undetectable in the simulation version and is difficult or impossible to locate. More specifically, the protection circuitry of the present invention is a circuit added to a pre-existing design (for example, inserted into the output netlist of a synthesis tool by a simulation generator), so that the inserted protection circuitry (which may be inserted in one or more locations and/or connected to one or more components of a designed circuit) has no effect on simulation and is relatively transparent. However, the inserted protection circuit prevents the user designed logic incorporating the protected electronic design from working if it is run through a synthesis tool and sent to a target device or other hardware.

As shown in FIG. 1B, it is simple for a simulation generator tool to insert additional functionality into a circuit being compiled (for example, additional functionality in the form of a few additional gates and flip-flops that also are protected by the simulation generator). When used with simulation generator tools that can "flatten" and obfuscate the IP, few clues to the modification made are available to a person attempting to synthesize a protected simulation version. A user trying to evaluate the designed circuit's output to decipher the added gates, etc. will find it difficult to locate and remove the instances of the protection circuitry inserted by the simulation generator. It is a non-trivial process to detect the presence of, locate and remove protection circuitry of the present invention from the simulation version.

User designed logic may include electronic designs such as proprietary IP and standard features, structures and circuits. One application of protection circuitry according to one embodiment of the present invention may be used in connection with a simple electronic design, one example of which is an unprotected 4-bit counter known to those skilled in the art and shown in FIG. 2A. The 4-bit counter 200 uses a clock signal 210 to operate a series of 4 flip-flops 220. Counter 200 may be implemented in a software simulation environment or may be implemented on a PLD after synthesis and uploading the design to the PLD. Feedback signals from flip-flops 220 are sent to a NOT gate 230, a series of XOR gates 240 and a pair of AND gates 250 to generate a binary count sequence at outputs 260-0, 260-1, 260-2 and 260-3 (which correspond to counter bit 0, bit 1, bit 2 and bit 3, respectively, in the timing diagram of FIG. 2B).

Figure 2B:
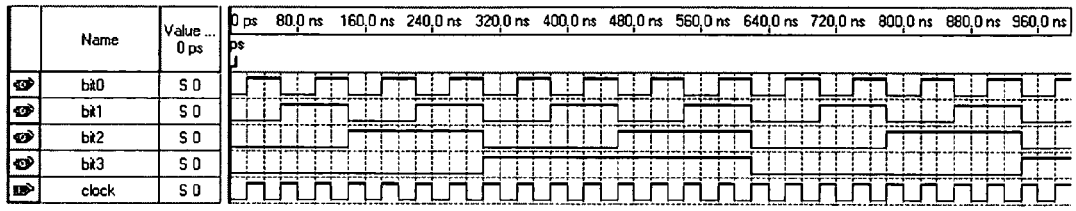
FIG. 2B is a timing diagram illustrating the output characteristics of the output bits of the 4-bit counter of FIG. 2A in both a simulation environment and in a hardware environment and illustrating the output characteristics of the output bits of protected logic in the form of the 4-bit counter of FIG. 3A in a simulation environment.

The signals generated when the 4-bit counter 200 is operating correctly are shown in the timing diagram of FIG. 2B. As seen in FIG. 2B, the clock signal generates a counting sequence in the signals labeled bit 0, bit 1, bit 2 and bit 3. The 4-bit counter 200 shown in FIG. 2A would operate correctly in both a simulation version of the circuit 200 in a simulation environment as well as the same circuit implemented in a hardware environment such as a PLD. Therefore, the signals of FIG. 2B would be the output of the electronic design 200 in both simulation and hardware.

FIG. 3A shows the same 4-bit counter protected by protection circuitry according to one embodiment of the present invention. Operation of the protection circuitry in this embodiment is based on a difference in register initialization procedures in simulation environments and hardware environments. Registers, flip-flops, etc. may be initialized in a simulation environment. That is, a register may be assigned a desired simulation initialization value prior to operation, testing and/or evaluation of the circuit design in which the initialized register is found. Thus, if a user wishes to have a register start operation with an simulation initialization value of "1" for testing, the simulation environment permits such initialization. Conversely, such simulation initialization values are not honored in a hardware environment. Instead, registers are assigned hardware initialization values of "0" in hardware environments, regardless of their simulation initialization values. This simulation/hardware environment difference is exploited in some embodiments of the present invention to prevent use of an electronic design in an unauthorized manner.

Figure 3B:
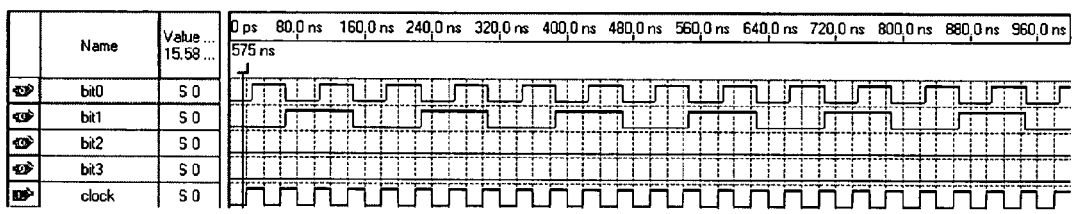
FIG. 3B is a timing diagram illustrating the output characteristics of the output bits of protected logic in the form of the modified 4-bit counter of FIG. 3A in a hardware environment.

In FIG. 3A, counter 300 utilizes the same basic counting circuit as that shown in FIG. 2A, using a clock signal 310 to operate a series of 4 flip-flops 320, feedback signals, NOT gate 330, a series of XOR gates 340 and a pair of AND gates 350 to generate a binary count sequence at outputs 360-0, 360-1, 360-2 and 360-3 shown in FIG. 3A. FIG. 3B is a timing diagram showing the output signals bit 0, bit 1, bit 2 and bit 3 at outputs 360-0, 360-1, 360-2 and 360-3, respectively. However, in this case the input of protection circuitry 370 has been connected to the clock signal 310 (circuitry added, including the protection circuitry 370 and its connections to counter 300, is shown in FIG. 3A with dotted lines and large, square connection points). The output 390 of protection circuit 370 is connected as an input to AND gates 350, as seen in FIG. 3A.

Using the ability to initialize registers such as flip-flops to "1" in simulation circuits, protection circuitry 370 is configured to always generate a logical "1" as its simulation output value (that is, when circuit 370 is operated in a simulation environment) and to always generate a logical "0" as its hardware output value (that is, when circuit 370 is operated in a hardware environment such as a PLD or other device). As a result of the environment-specific output of protection circuitry 370, inputting a logical "1" to each AND gate 350 in a simulation environment does not change the output of each AND gate 350 in a simulation environment from what it would be if the added input were not present, thus generating the same output as each corresponding AND gate 250 in the 4-bit counter 200 of FIG. 2A, where no protection circuitry is present. The output signals of the simulation version of the electronic design (counter 300) are thus the same as those of the unprotected version of the electronic design (counter 200), as shown in FIG. 2B.

Therefore, in a simulation environment, the counter 300 operates correctly and provides a user with an accurate depiction of how the counter 300 (and/or any other designed logic implemented by a user to which the protection circuitry 370 is connected) will operate implemented on hardware, for example, a PLD. As will be appreciated by those skilled in the art, the appropriate output of the protection circuitry 370 might also be inverted (always being "0" in a simulation environment and always being a "1" in a hardware environment), and be used as the input to one or more OR gates in the electronic design. Other ways in which the appropriate output of protection circuitry as disclosed herein could be used will be obvious to those skilled in the art after reading the present disclosure.

The hardware output value of the protection circuitry 370 is always "0" when implemented in hardware. Therefore, the outputs of the AND gates 350 are always "0" in a hardware environment, regardless of the other inputs to the AND gates 350. This leads to the signal outputs shown in the timing diagram of FIG. 3B. The outputs for the bit 0 and bit 1 signals in the counter 300 are identical to the outputs of their counterparts in the unprotected version of the electronic design (counter 200 of FIG. 2A) and evince proper operation of the counter 300. However, as reflected in the timing diagram of FIG. 3B, the output signals of bit 2 and bit 3 of the counter 300 remain "stuck" on "0" and the protected version of the electronic design thus does not operate properly in a hardware environment.

Figures 4, 5B:
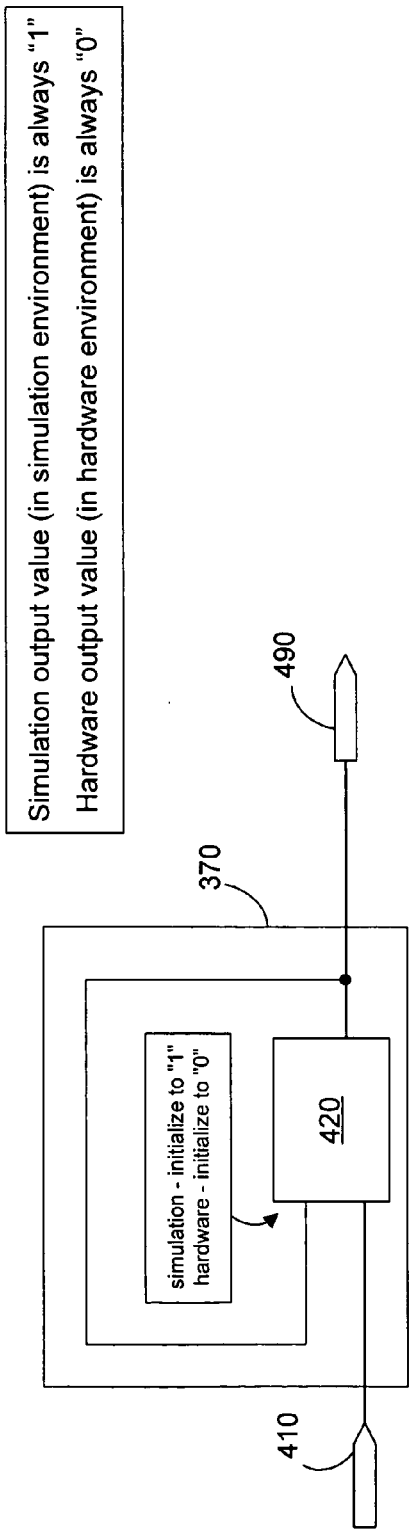
FIG. 4 is a schematic diagram of a simple protection circuitry according to one embodiment of the present invention.
FIG. 5B includes Table 5-1, which shows output values of various components of the protection circuit of FIG. 5A in a simulation environment, and Table 5-2, which shows output values of various components of the protection circuit of FIG. 5A in a synthesis environment.

FIG. 4 illustrates a very simple embodiment of the protection circuitry 370 that can be used in connection with the protected version of an electronic design, such as the 4-bit counter 300 of FIG. 3A. In FIG. 4, the protection circuitry 370 includes a register or flip-flop 420 having a simulation initialization value of "1" and two inputs—a clock input and a variable input. A clock generator 410 provides a clock signal to the register 420. The output 490 of the register 420 is fed back to the variable input of the register 420. In a simulation environment, the simulation output value of the protection circuitry 370 shown in FIG. 4 is "1" and remains "1" with every clock cycle. Conversely, due to the fact that a protected version of the electronic design using the protection circuitry of FIG. 4 implemented on hardware cannot initialize a register to "1", register 420 is initialized to "0" in a hardware environment and the hardware output value remains "0" with every clock cycle. When used in connection with the counter 300 illustrated in FIG. 3A, the desired protected circuit behavior is realized.

Many synthesis tools will remove what they determine to be superfluous circuitry and structure found in programmed logic. In such systems, simple protection circuitry such as the one shown in FIG. 4 might be removed if it is not recognized as providing sufficient functionality. Consequently, more substantive protection circuitry may be required in some circumstances to ensure that it survives synthesis intact. In situations where an IP owner does not know whether a synthesis tool will remove superfluous circuitry, it is safer to include more substantive protection circuitry that will withstand synthesis tool scrutiny.

Figure 5A:
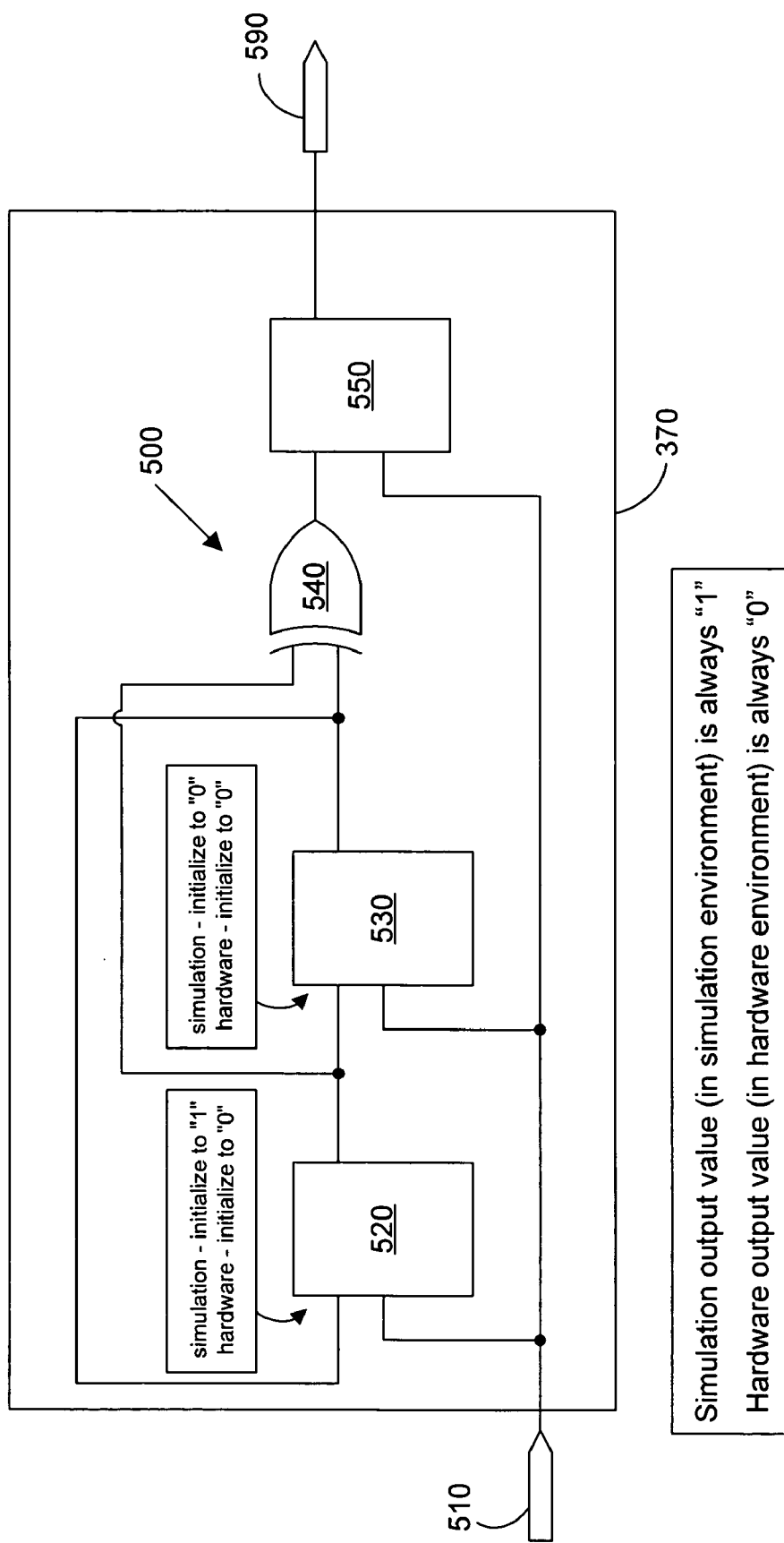
FIG. 5A is a schematic diagram of a protection circuit according to a different embodiment of the present invention.

A more substantive embodiment of the protection circuitry 370 of FIG. 3A is shown in FIG. 5A, again utilizing the initializability of registers in a simulation environment. The clock line 510 is an input to a first flip-flop 520 that is controlled by the clock signal, has a simulation initialization value of "1" in a simulation environment and has a variable input. The clock line 510 also is an input to a second flip-flop 530 that is controlled by the clock signal, has a simulation initialization value of "0" in a simulation environment and has a variable input. Finally, clock line 510 is an input to an output flip-flop 550 that is controlled by the clock signal and also has a variable input.

As the clock signal toggles between its "0" and "1" values, the flip-flops 520, 530 operate as a 2-bit ring oscillator or shift register, alternating between "01" and "10" output pairings, as seen in Table 5-1 of FIG. 5B (which includes Table 5-1 showing signal values for various components of circuit 500 in a simulation environment and Table 5-2 showing signal values for various components of circuit 500 in a hardware environment). These alternate output pairings in the simulation environment are inputs to XOR gate 540, which always outputs a "1" when the alternating "01" and "10" signals are presented to the XOR gate inputs. Flip-flop 550 is initialized to "1" in a simulation environment and maintains the "1" value so long as "I" is the output value of XOR gate 540. Flip-flop 550 is present in the embodiment shown in FIG. 5A to improve the reliability of the protection circuit 500, primarily to assist in avoiding timing and other errors. In some embodiments of the present invention, flip-flop 550 can be removed, with the attendant risk that a timing or other error might alert a user to the presence of the protection circuitry 370 as part of the programmed logic. Whether or not third flip-flop 550 is present, the simulation output value of the protection circuitry 500 is always "1" which assures correct operation of the programming version of the electronic design.

As noted above, current systems ignore simulation initialization values in registers and set them to "0" as hardware initialization values at power up. Therefore, the hardware initialization values of registers 520 and 550 are "0" in a hardware environment, as opposed to the simulation environment in which a "1" may be initialized in registers. As seen in Table 5-2 of FIG. 5B, the initialization of registers 520 and 530 to "0" means that they will stay at "0" as a result of the feedback signals connected to the flip-flops' variable inputs in protection circuitry 500. The constant "00" inputs to the XOR gate 540 means that its output will always be "0" and will be passed to the output 590 of protection circuitry 500 by register 550. Again, whether or not timing flip-flop 550 is used, the hardware output value of the protection circuitry 500 is always "0" and always forces incorrect operation of the programming version of the electronic design. As an input to AND gates 350 in the counter 300, this constant hardware output value of "0" means that the bit 2 and bit 3 outputs seen in FIG. 3B at outputs 360-2 and 360-3, respectively, will remain "0" and disable proper functioning of hardware on which the counter 300 (having added protection circuitry 500) are implemented.

Figure 6:
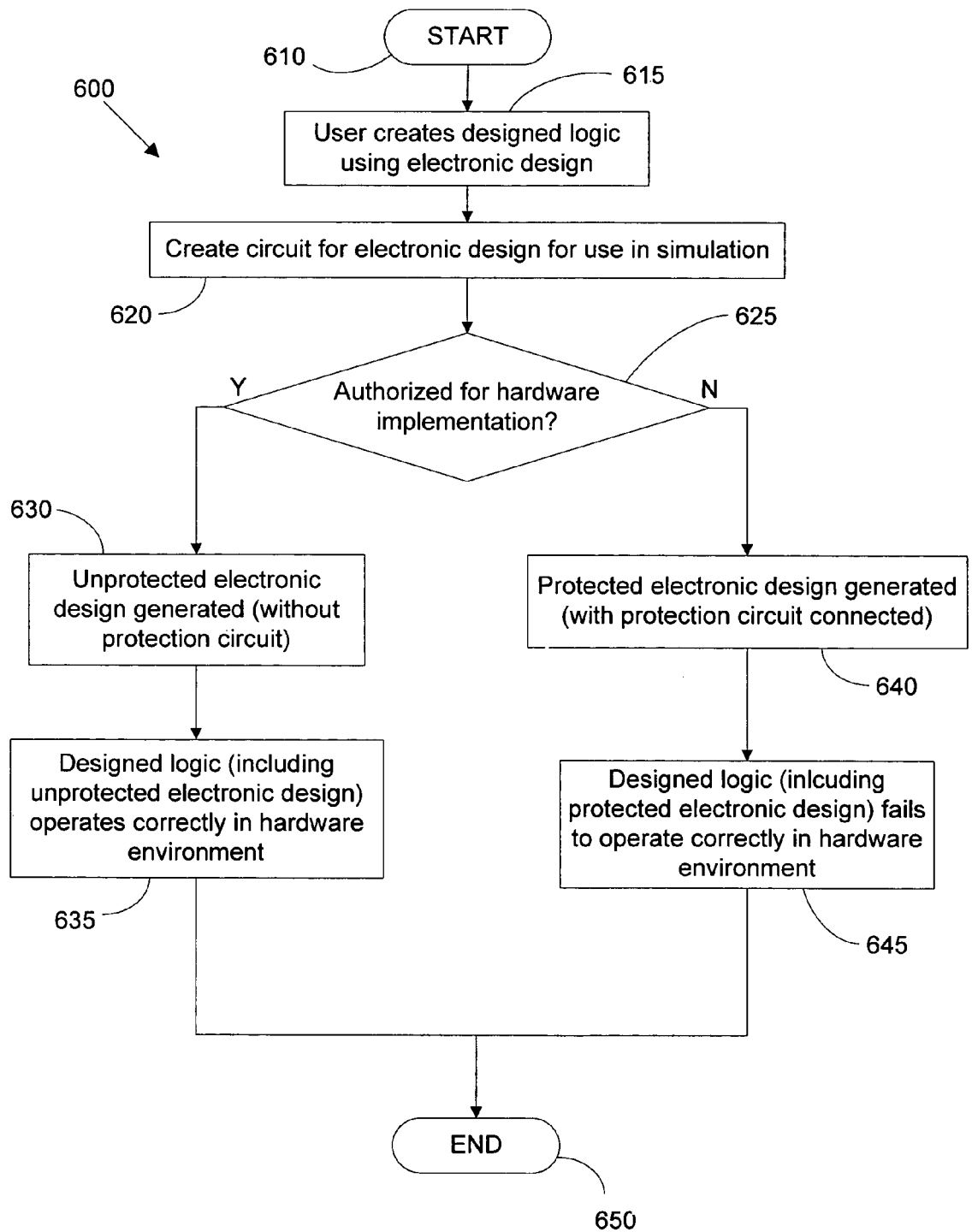
FIG. 6 is a flow diagram illustrating one method implementing an embodiment of the present invention.

One method of implementing the present invention is illustrated in FIG. 6. The method starts 610 and a user creates designed logic using an electronic design 615. Using a simulation generator, simulated logic is generated using whatever IP the user may want to employ. In one embodiment of the present invention, a protected simulation version and a programming version of the electronic design circuit are generated for use in simulation at 620. The protected simulation version of the electronic design can then be tested. When the user attempts to implement the electronic design in hardware, a decision 625 is made as to whether the user has authority to implement the IP in hardware.

If the user has obtained needed authority, then the programming version 630 is used to generate an unprotected version of the electronic design. In that case, the electronic design and the user's designed logic operate correctly 635 when run in a hardware environment. If the user has not obtained authority to implement IP being used in the designed logic in hardware, and uses the protected simulation version of the electronic design, then the protected logic is synthesized 640 to create a netlist of the electronic design retaining the protection circuitry added during simulation generation. When operated in a hardware environment 645, the protected version of the electronic design fails to operated correctly, thus preventing unauthorized hardware use of one or more blocks of IP and/or megafunctions.

In an alternate embodiment of the method of FIG. 6, a system might add the protection circuitry after decision 625 if the user does not have appropriate authorization to use the electronic design in a hardware environment. Variations on the methodologies of the present invention will be obvious to those skilled in the art after reviewing the present invention disclosure.

Figure 7:
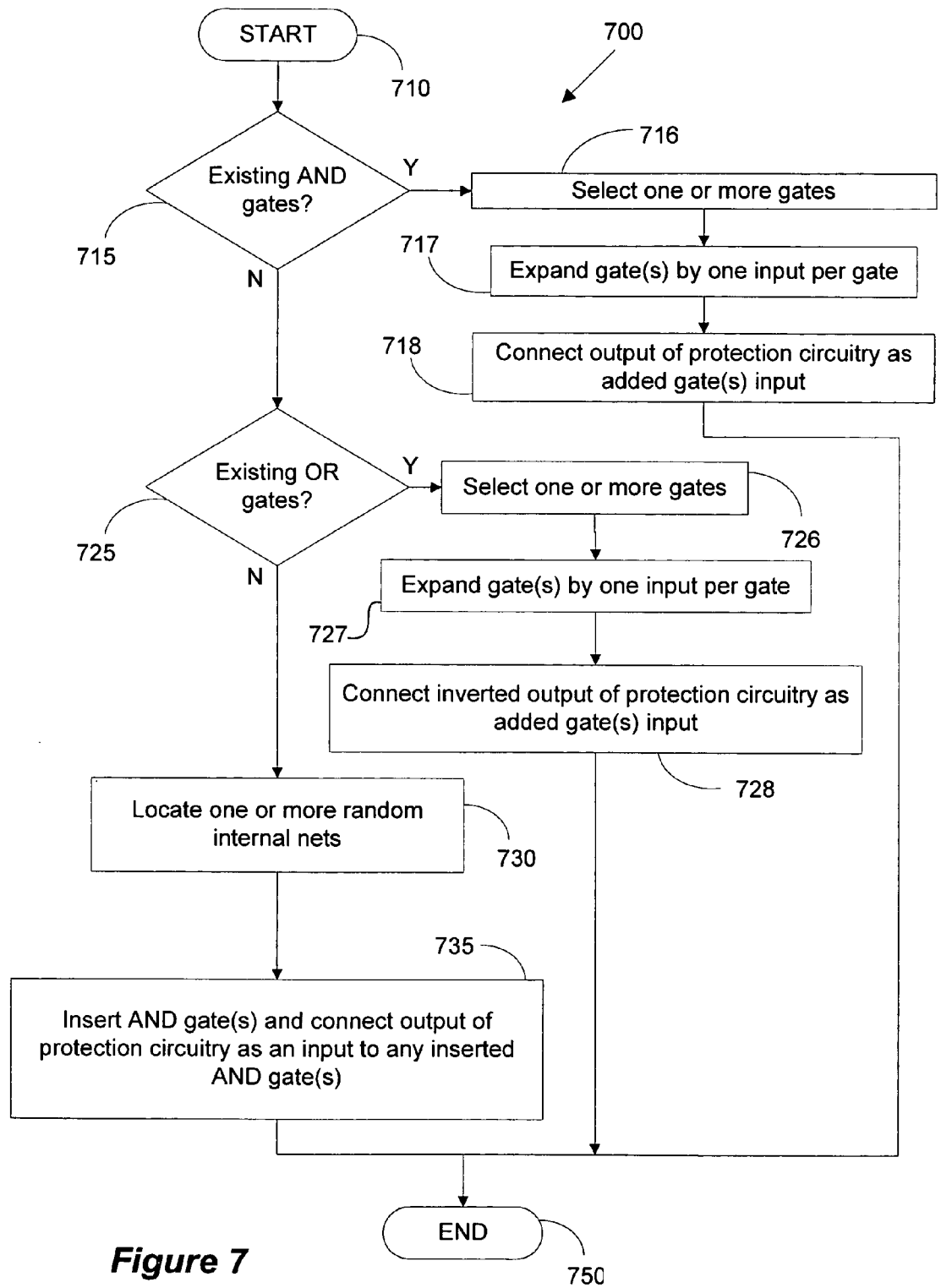
FIG. 7 is a flow diagram illustrating one method of adding protection circuitry to an unprotected version of an electronic design to create a protected version of the electronic design.

Many methods of adding the protection circuitry to an electronic design will be obvious to those skilled in the art. One example of such a method is shown in FIG. 7. The method starts 710 and determines whether there are any existing AND gates 715 in the unprotected version of the electronic design that are suitable for adding the protection circuitry. If such one or more such AND gates exist, then one or more of those gates are selected 716 and each selected gate is expanded by one input per gate 717. The output of the protection circuitry is then connected 718 to the added inputs of the selected AND gates. In some embodiments of the present invention, up to 20 gates can be selected and connected to the protection circuitry.

If no suitable AND gates are located, it is then determined 725 whether there are any suitable OR gates available. If so, then one or more of the OR gates are selected 726 and each selected gate is expanded by one input per gate 727. The inverted output of the protection circuitry is then connected 728 to each selected OR gate's added input. Again, the number of gates to which the protection circuitry is connected is a matter of design choice. As will also be apparent to those skilled in the art, a combination of AND gates and OR gates may be used, taking care to connect the appropriate output from the protection circuitry to the selected gates (for example, if the simulation output value of the protection circuitry is normally "1", that can be used as an input for selected AND gates, while an inverted output of "0" should be used for selected OR gates).

Where no suitable preexisting AND and OR gates are found in the unprotected version of the electronic design, one or more random internal nets may be located 730. One or more AND gates are inserted and have one input connected to the protection circuitry. To make reverse engineering more difficult, use of input pins, output pins and register clock sources is avoided (gated clocks typically give warnings on synthesis tools).

Figure 8:
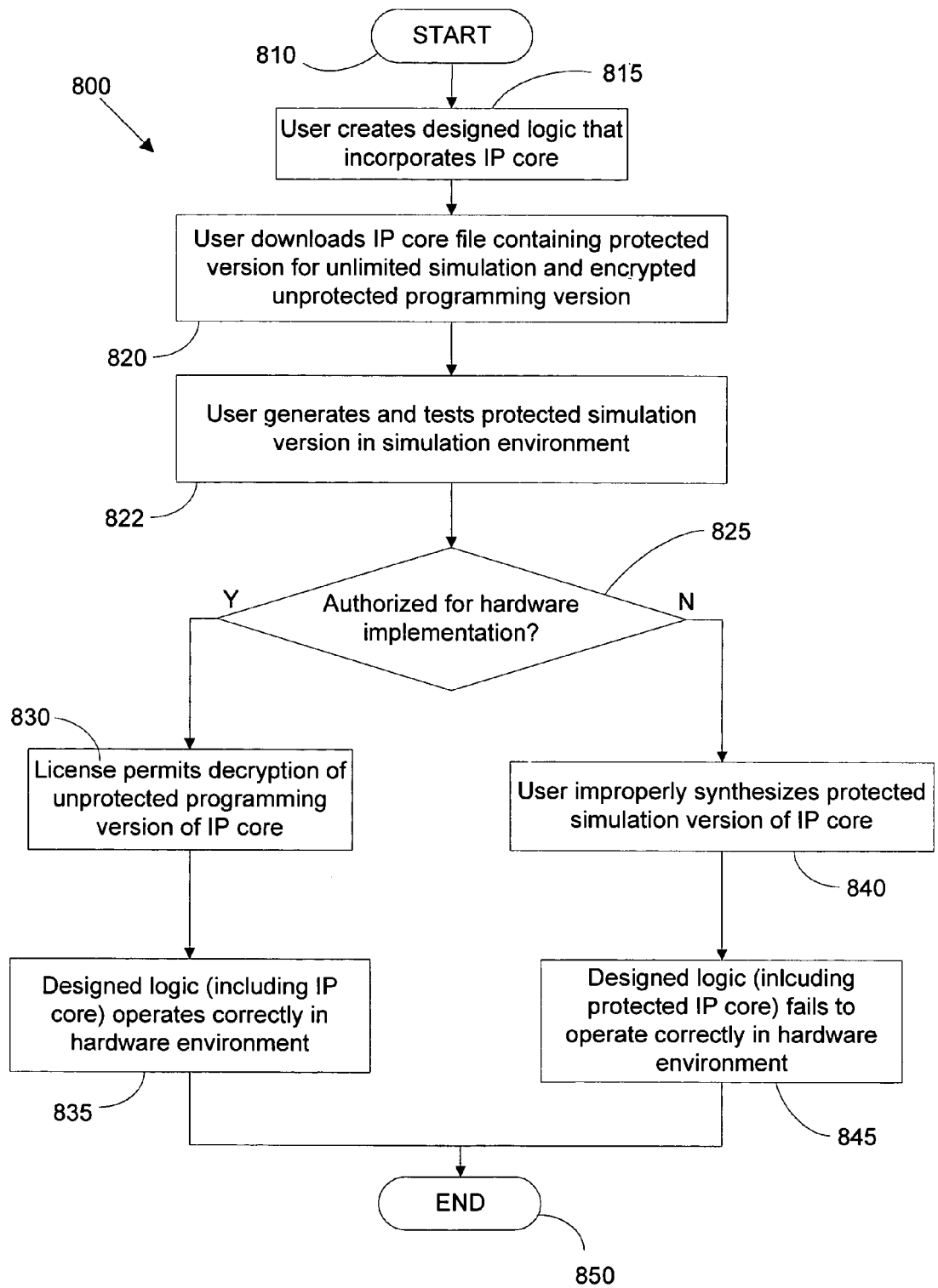
FIG. 8 is a flow diagram illustrating another method implementing an embodiment of the present invention.

Another method of implementing the present invention is illustrated in FIG. 8, using the simulation version and programming version of the electronic design, as discussed above. The method starts 810 and a user creates designed logic 815, using an IP core protected with an embodiment of the present invention. At 820 the user downloads the IP core file, which contains a simulation version of the IP core, which is available for unlimited simulation testing and use and which incorporates instructions to insert the protection circuitry, and an encrypted programming version of the IP core that does not include instructions to insert the protection circuitry. The user generates and tests the protected version of the electronic design in a simulation environment, obtaining an accurate evaluation of whether the selected IP core will function correctly in the user's designed logic. The user then has to decide 825 whether or not to obtain proper authorization to use the IP owner's IP core for synthesis and implementation in hardware. If the user improperly attempts to circumvent authorization and synthesizes the protected version of the circuit at 840, then the designed logic, which includes the protected IP core, will fail to operated correctly in a hardware environment. If, however, the user obtains proper authorization from the IP owner (for example, a license for hardware use of the IP core), that authorization permits decryption at 830 of the unprotected programming version of the IP core for synthesis and implementation in a hardware environment. The designed logic then operates correctly in the hardware environment at 835.

Generally, embodiments of the present invention employ various processes involving data stored in or transferred through one or more computer systems. Embodiments of the present invention also relate to a hardware device or other apparatus for performing these operations. This apparatus may be specially constructed for the required purposes, or it may be a general-purpose computer selectively activated or reconfigured by a computer program and/or data structure stored in the computer. The processes presented herein are not inherently related to any particular computer or other apparatus. In particular, various general-purpose machines may be used with programs written in accordance with the teachings herein, or it may be more convenient to construct a more specialized apparatus to perform the required method steps. A particular structure for a variety of these machines will be apparent to those of ordinary skill in the art based on the description given below.

Embodiments of the present invention as described above employ various process steps involving data stored in computer systems. These steps are those requiring physical manipulation of physical quantities. Usually, though not necessarily, these quantities take the form of electrical or magnetic signals capable of being stored, transferred, combined, compared, and otherwise manipulated. It is sometimes convenient, principally for reasons of common usage, to refer to these signals as bits, bitstreams, data signals, values, elements, variables, characters, data structures, or the like. It should be remembered, however, that all of these and similar terms are to be associated with the appropriate physical quantities and are merely convenient labels applied to these quantities.

Further, the manipulations performed are often referred to in terms such as identifying, fitting, or comparing. In any of the operations described herein that form part of the present invention these operations are machine operations. Useful machines for performing the operations of embodiments of the present invention include general purpose digital computers or other similar devices. In all cases, there should be borne in mind the distinction between the method of operating a computer and the method of computation itself. Embodiments of the present invention relate to method steps for operating a computer in processing electrical or other physical signals to generate other desired physical signals.

Embodiments of the present invention also relate to an apparatus such as hardware for performing these operations. This apparatus may be specially constructed for the required purposes, or it may be a general purpose computer selectively activated or reconfigured by a computer program stored in the computer. The processes presented herein are not inherently related to any particular computer or other apparatus. In particular, various general purpose machines may be used with programs written in accordance with the teachings herein, or it may be more convenient to construct a more specialized apparatus to perform the required method steps. The required structure for a variety of these machines will appear from the description given above.

In addition, embodiments of the present invention further relate to computer readable media that include program instructions for performing various computer-implemented operations. The media and program instructions may be those specially designed and constructed for the purposes of the present invention, or they may be of the kind well known and available to those having skill in the computer software arts. Examples of computer-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter.

Figure 9:
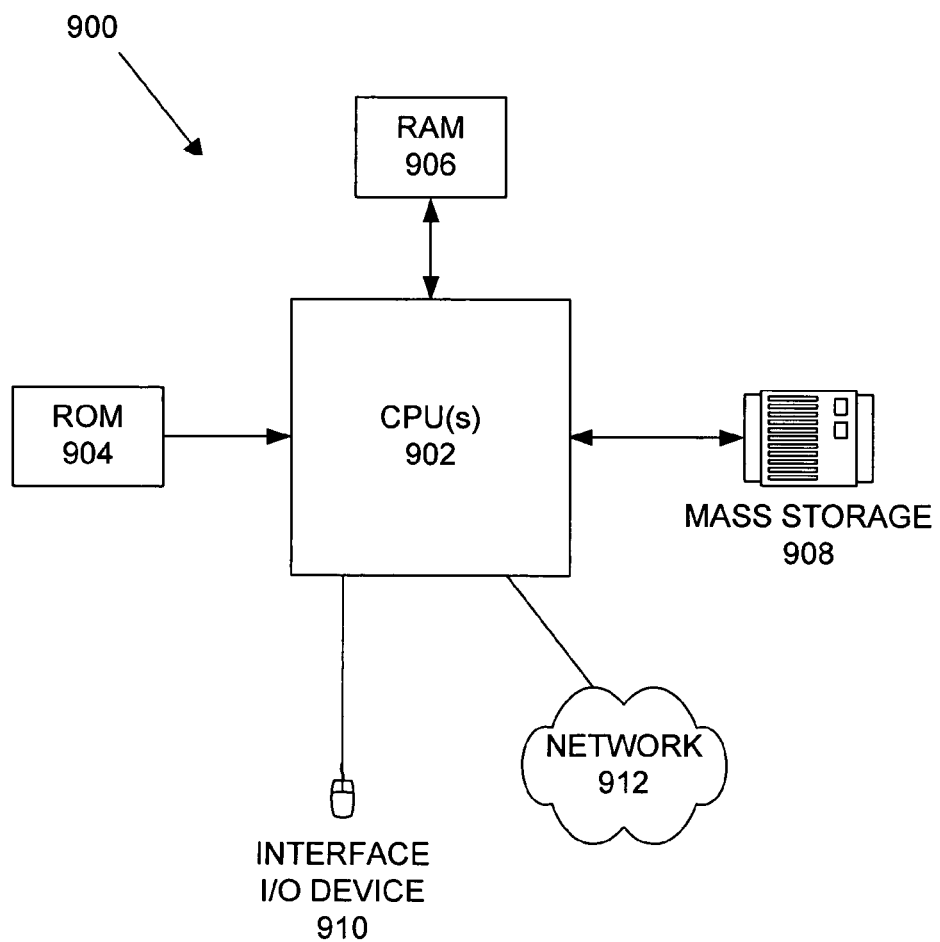
FIG. 9 is a block diagram of a typical computer system suitable for implementing an embodiment of the present invention.

FIG. 9 illustrates a typical computer system that can be used by a user and/or controller in accordance with one or more embodiments of the present invention. The computer system 900 includes any number of processors 902 (also referred to as central processing units, or CPUs) that are coupled to storage devices including primary storage 906 (typically a random access memory, or RAM) and another primary storage 904 (typically a read only memory, or ROM). As is well known in the art, primary storage 904 acts to transfer data and instructions uni-directionally to the CPU and primary storage 906 is used typically to transfer data and instructions in a bi-directional manner. Both of these primary storage devices may include any suitable computer-readable media described above. A mass storage device 908 also is coupled bi-directionally to CPU 902 and provides additional data storage capacity and may include any of the computer-readable media described above. The mass storage device 908 may be used to store programs, data and the like and is typically a secondary storage medium such as a hard disk that is slower than primary storage. It will be appreciated that the information retained within the mass storage device 908, may, in appropriate cases, be incorporated in standard fashion as part of primary storage 906 as virtual memory. A specific mass storage device such as a CD-ROM may also pass data uni-directionally to the CPU.

CPU 902 also is coupled to an interface 910 that includes one or more input/output devices such as such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 902 optionally may be coupled to a computer or telecommunications network using a network connection as shown generally at 912. With such a network connection, it is contemplated that the CPU might receive information from the network, or might output information to the network in the course of performing the above-described method steps. The above-described devices and materials will be familiar to those of skill in the computer hardware and software arts.

Figure 10:
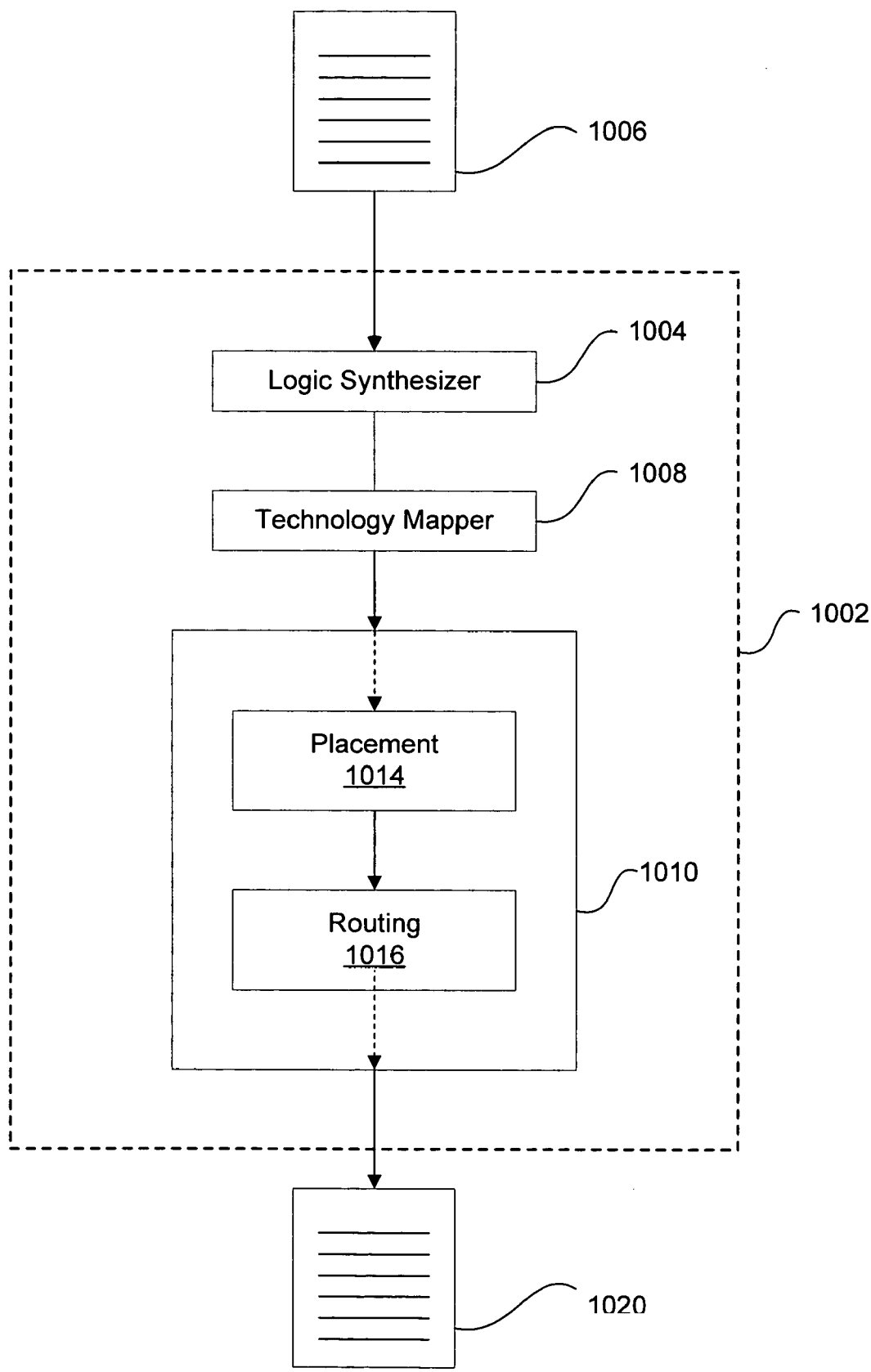
FIG. 10 is a block diagram showing modules that may be employed in a PLD design compiler of this invention.

The hardware elements described above may define multiple software modules for performing the operations of this invention. For example, instructions for running a simulation generator, a synthesis tool or any other appropriate program may be stored on mass storage device 908 or 904 and executed on CPU 902 in conjunction with primary memory 906. In synthesizing a design from a simulation version, a user may use a compiler to generate the design for implementation on hardware. Referring to FIG. 10, a compiler 1002 includes a logic synthesizer 1004 which creates a synthesized netlist from a user's high level electronic design 1006. Compiler 1002 also includes a technology mapper 1008 which maps gates from the synthesized netlist into logic cells. Finally, compiler 1002 includes a place and route module 1010 which in turn includes a placement module 1014 and a routing module 1016. Placement module 1014 places logic cells onto specific logic elements of a target hardware device. Routing module 1016 connects wires between the inputs and outputs of the various logic elements in accordance with the logic required to implement the electronic design.

Compiler 1002 outputs a compiled design 1020. It should be understood that other compiler designs may be employed with this invention. For example, some compilers will include a partitioning module to partition a technology mapped design onto multiple hardware entities. In addition, the compiler may be adapted to handle hierarchical designs, whereby synthesis, mapping, etc. are performed recursively as the compiler moves down branches of a hierarchy tree. Additional details of compiler software for PLDs may be found in U.S. Pat. No. 6,080,204, issued Jun. 27, 2000, naming Mendel as inventor, and entitled "METHOD AND APPARATUS FOR CONTEMPORANEOUSLY COMPILING AN ELECTRONIC CIRCUIT DESIGN BY CONTEMPORANEOUSLY BIPARTITIONING THE ELECTRONIC CIRCUIT DESIGN USING PARALLEL PROCESSING."

Figure 11:
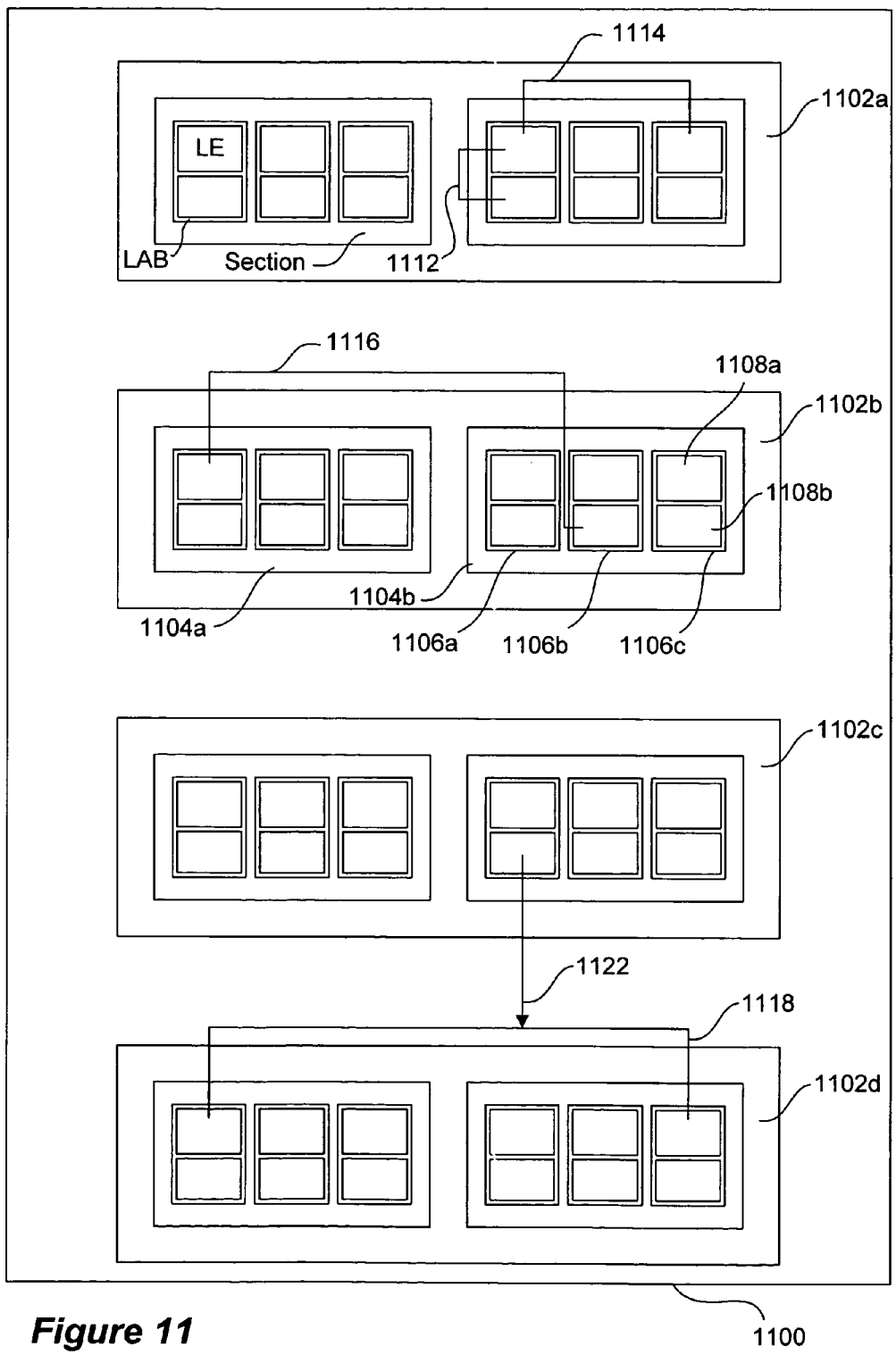
FIG. 11 is an idealized block representation of the architecture of an arbitrary hardware device, including interconnects, which may be employed in fitting gates from a synthesized sub-netlist generated in accordance with this invention.

The form of a compiled design may be further understood with reference to a hypothetical target hardware device having multiple hierarchical levels. Such a hardware device is represented in FIG. 11. This idealized representation roughly conforms to the layout of a FLEX 10K programmable logic device available from Altera Corporation of San Jose, Calif. In FIG. 11, a programmable logic device 1100 is segmented into a plurality of "rows" to facilitate interconnection between logic elements on a given row. In the hypothetical example shown, there are four rows: 1102*a*, 1102*b*, 1102*c*, and 1102*d*.

Each row of programmable logic device 1100 is further subdivided into two "half-rows." For example, row 1102*b* is shown to contain a half-row 1104*a* and a half-row 1104*b*. The next lower level of the hierarchy is the "logic array block" (LAB). Half-row 1104*b*, for example, contains three LABs: an LAB 1106*a*, an LAB 1106*b*, and an LAB. 1106*c*. Finally, at the base of the of the hierarchy are several logic elements. Each such logic element exists within a single logic array block. For example, LAB 1106*c* includes two logic elements: a logic element 1108*a* and a logic element 1108*b*.

In short, PLD 1100 includes four hierarchical levels: (1) rows, (2) half-rows, (3) LABs, and (4) logic elements (LEs). Any logic element within PLD 1100 can be uniquely specified (and located) by specifying a value for each of these four levels of the containment hierarchy. For example, logic element 1108*b* can be specified as follows: row (2), half-row (2), LAB (3), LE (2). To fit a logic design onto a target hardware device such as that shown in FIG. 11, a synthesized netlist is divided into logic cells (typically containing one or more gates) which are placed in the various logic elements as uniquely defined above. Thus, each logic cell from the synthesized netlist resides in a unique single logic element.

Often, a multi-level hardware hierarchy such as that shown in PLD 1100 includes multiple levels of routing lines (interconnects). These connect the uniquely placed logic cells to complete circuits. In PLD 1100, for example, four levels of interconnect are provided, one for each of the four hierarchy levels. First a local interconnect such as interconnect 1112 is employed to connect two logic elements within the same LAB. At the next level, a LAB-to-LAB interconnect such as interconnect 1114 is employed to connect two LABs within the same half-row. At the next higher level, a "global horizontal" interconnect is employed to connect logic elements lying in the same row but in different half-rows. An example of a global horizontal interconnect is interconnect 1116 shown in row 1102*b*. Another global horizontal interconnect is shown as interconnect 1118, linking logic elements within row 1102*d*. Finally, a "global vertical" interconnect is employed to link a logic element in one row with a logic element in a different row. For example, a global vertical interconnect 1122 connects a logic element in the first LAB of the second half-row of row 1102*c* to two separate logic elements in row 1102*d*. In the embodiment shown, this is accomplished by providing global vertical interconnect 1102 between the above-described logic element in row 1102*c* to global horizontal interconnect 1118 in row 1102*d*. Consistent with the architecture of Altera Corporation's FLEX 10K CPLD, global vertical interconnects are directly coupled to the logic element transmitting a signal and indirectly coupled (through a global horizontal interconnect) to the logic elements receiving the transmitted signal.

In a target hardware device, there will be many paths available for routing a given signal line. During the routing stage, these various possible routing paths must be evaluated to determine which is best for the design being fit. The interconnect structure and overall architecture of the Altera FLEX 10K family of PLDs is described in much greater detail in U.S. Pat. No. 5,550,782, issued Aug. 27, 1996, naming Cliff et al. as inventors, and entitled "PROGRAMMABLE LOGIC ARRAY INTEGRATED CIRCUITS." That patent is incorporated herein by reference for all purposes. Additional discussion of the FLEX 10K and other PLD products may be found in other publications from Altera Corporation of San Jose, Calif.

Briefly, in the FLEX 10K architecture, there are at least three rows, with two half-rows per row, and twelve LABs per half-row. Each LAB includes eight logic elements each of which, in turn, includes a 4-input look-up table, a programmable flip-flop, and dedicated signal paths for carry and cascade functions. The eight logic elements in an LAB can be used to create medium-sized blocks of logic—such as 9-bit counters, address decoders, or state machines—or combined across LABs to create larger logic blocks.

It should be understood that the present invention is not limited to the Altera FLEX 10K architecture or any other hardware architecture for that matter. In fact, it is not even limited to programmable logic devices. It may be employed generically in target hardware devices as broadly defined above and preferably in application specific integrated circuit designs. PLDs are just one example of ASICs that can benefit from application of the present invention.

Figure 12:
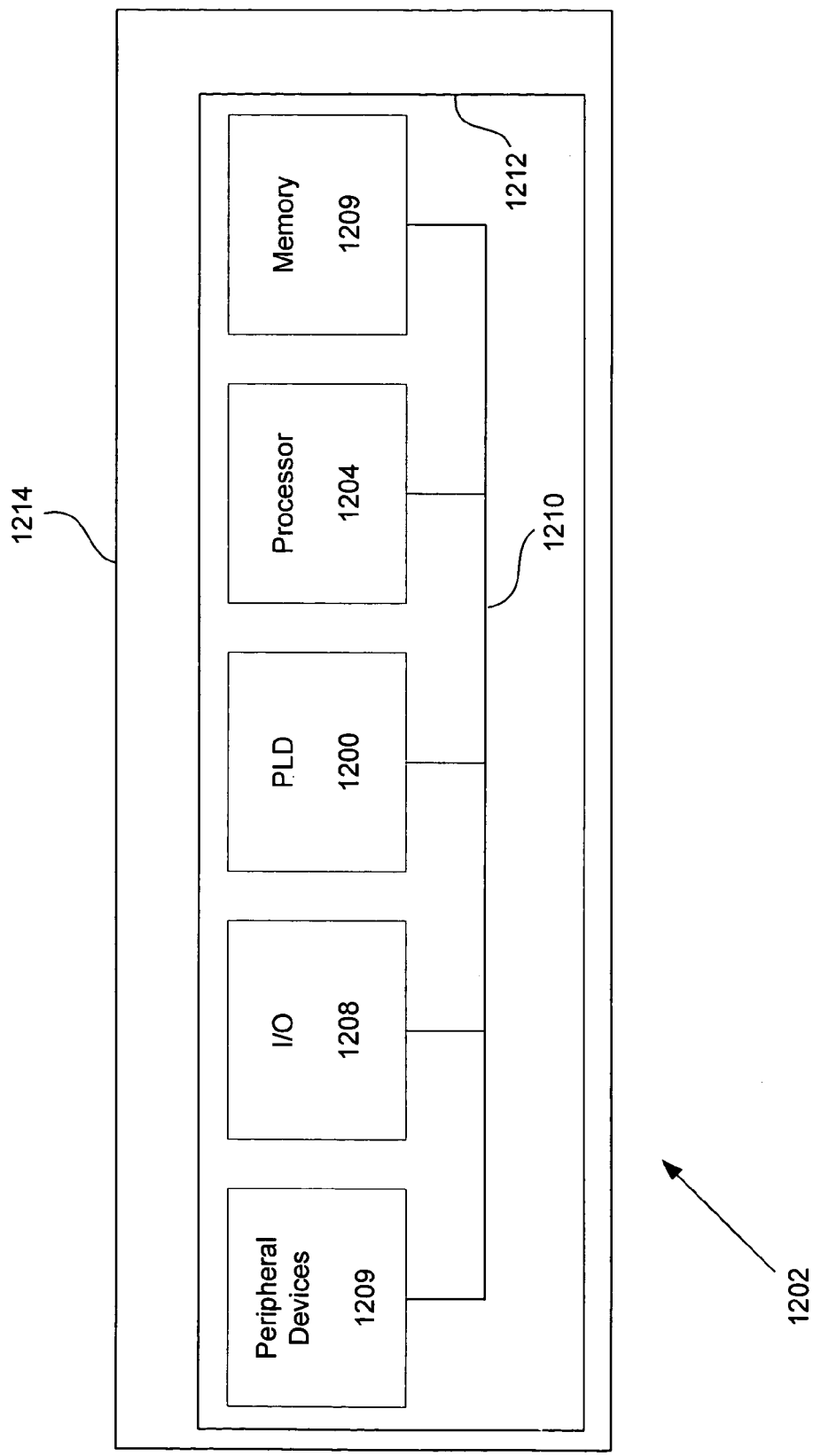
FIG. 12 is a block diagram depicting a system containing a PLD prepared in accordance with this invention.

This invention also relates to programmable logic devices programmed with a design prepared in accordance with the above described methods. The invention further relates to systems employing such programmable logic devices. FIG. 12 illustrates a PLD 1200 of the present invention in a data processing system 1202. The data processing system 1202 may include one or more of the following components: a processor 1204; memory 1206; I/O circuitry 1208; and peripheral devices 1209. These components are coupled together by a system bus 1210 and are populated on a circuit board 1212 which is contained in an end-user system 1214.

The system 1202 can be used in a wide variety of applications, such as computer networking, data networking, instrumentation, video processing, digital signal processing, or any other application where the advantage of using reprogrammable logic is desirable. The PLD 1200 can be used to perform a variety of different logic functions.

The many features and advantages of the present invention are apparent from the written description, and thus, the appended claims are intended to cover all such features and advantages of the invention. Further, since numerous modifications and changes will readily occur to those skilled in the art, the present invention is not limited to the exact construction and operation illustrated and described. Therefore, the described embodiments are illustrative and not restrictive, and the invention should not be limited to the details given herein but should be defined by the following claims and their full scope of equivalents, whether foreseeable or unforeseeable now or in the future.

What is claimed is:

1. A method of producing a simulation version of an electronic design, which cannot be directly compiled to produce a correctly operating hardware implementation of the electronic design, the method comprising:
   receiving an unprotected version of the electronic design suitable for direct compilation to a correctly operating hardware implementation of the electronic design; and
   adding protection circuitry to produce a protected version of the electronic design from which the simulation version is to be created;
   wherein the protection circuitry does not substantially impact the accuracy of a simulation result, but prevents a correctly operating implementation of the electronic design in a hardware environment.

2. A method as recited in claim 1, wherein the unprotected version of the electronic design is provided in an HDL source format.

3. A method as recited in claim 1, wherein the electronic design is a reusable IP core.

4. A method as recited in claim 1, wherein adding protection circuitry comprises:
   identifying a location for connecting the protection circuitry to the unprotected version of the electronic design; and
   connecting the protection circuitry to the unprotected version of the electronic design.

5. A method as recited in claim 1, wherein adding protection circuitry comprises at least one of the following steps:
   locating one or more existing AND gates and connecting an appropriate output of the protection circuitry to at least one located AND gate; or
   locating one or more existing OR gates and connecting an appropriate output of the protection circuitry to at least one located OR gate; or
   locating one or more existing random internal nets and connecting an appropriate output of the protection circuitry to at least one AND gate inserted to at least one located internal net; or
   locating one or more existing random internal nets and connecting an appropriate output of the protection circuitry to at least one OR gate inserted to at least one located internal net.

6. A method as recited in claim 5, wherein the protection circuitry always outputs a simulation output value in a simulation environment and always outputs a hardware output value in a hardware environment, further wherein the simulation output value and hardware output value are different.

7. A method as recited in claim 1, wherein the protection circuitry always outputs a simulation output value in a simulation environment and always outputs a hardware output value in a hardware environment, further wherein the simulation output value and hardware output value are different.

8. A method as recited in claim 1, wherein the protection circuitry comprises a shift register.

9. A method as recited in claim 1, wherein the protection circuitry comprises:
   a first flip-flop comprising:
      a clock input;
      a variable input; and
      an output;
   a second flip-flop comprising:
      a clock input;
      a variable input; and
      an output;
   wherein the output of the first flip-flop is provided to the variable input of the second flip-flop and further wherein the output of the second flip-flop is provided to the variable input of the first flip-flop;
   an XOR gate comprising:
      a first input connected to the output of the first flip-flop;
      a second input connected to the output of the second flip-flop; and
      an output;
   wherein the first flip-flop has simulation initialization value of "1" and a hardware initialization value of "0"; and
   further wherein the second flip-flop has a simulation initialization value of "0" and a hardware initialization value of "0".

10. A method as recited in claim 9, wherein the protection circuitry further comprises:
    a third flip-flop initialized to a logical "1" and comprising:
       a clock input;
       a variable input connected to the output of the XOR gate; and
       an output.

11. A method as recited in claim 1, wherein the protection circuitry comprises:
    a flip-flop comprising:
       a clock input;
       a variable input; and
       an output;
    wherein the output of the flip-flop is fed back to the variable input of the flip-flop; and
    further wherein an output of the flip-flop is the output of the protection circuitry.

12. A method as recited in claim 1, wherein adding protection circuitry is performed automatically.

13. An apparatus for producing a simulation version of an electronic design, which cannot be directly compiled to produce a correctly operating hardware implementation of the electronic design, the apparatus comprising:
    one or more processors;
    memory; and
    a protection module for adding protection circuitry to an unprotected version of the electronic design to produce a protected version of the electronic design from which the simulation version is to be created, wherein the protection circuitry does not substantially impact the accuracy of a simulation result, but prevents a correctly operating implementation of the electronic design in a hardware environment.

14. An apparatus as recited in claim 13, wherein the unprotected version of the electronic design is in a HDL source format.

15. An apparatus as recited in claim 13, wherein the electronic design is a reusable IP core.

16. An apparatus as recited in claim 13, wherein the protection module comprises:
   a scanning module identifying a location for connecting the protection circuitry to the unprotected version of the electronic design; and
   a connection module for connecting the protection circuitry to the unprotected version of the electronic design.

17. An apparatus as recited in claim 13, wherein the protection module for adding protection circuitry comprises at least one of the following steps:
   locating one or more existing AND gates and connecting an appropriate output of the protection circuitry to at least one located AND gate; or
   locating one or more existing OR gates and connecting an appropriate output of the protection circuitry to at least one located OR gate; or
   locating one or more existing random internal nets and connecting an appropriate output of the protection circuitry to at least one AND gate inserted to at least one located internal net; or
   locating one or more existing random internal nets and connecting an appropriate output of the protection circuitry to at least one OR gate inserted to at least one located internal net.

18. An apparatus as recited in claim 13, wherein the protection circuitry always outputs a simulation output value in a simulation environment and always outputs a hardware output value in a hardware environment, further wherein the simulation output value and hardware output value are different.

19. An apparatus as recited in claim 13, wherein the protection circuitry comprises a shift register.

20. An apparatus as recited in claim 13, wherein the protection circuitry comprises:
   a first flip-flop comprising:
      a clock input;
      a variable input; and
      an output;
   a second flip-flop comprising:
      a clock input;
      a variable input; and
      an output;
   wherein the output of the first flip-flop is provided to the variable input of the second flip-flop and further wherein the output of the second flip-flop is provided to the variable input of the first flip-flop;
   an XOR gate comprising:
      a first input connected to the output of the first flip-flop;
      a second input connected to the output of the second flip-flop; and
      an output;
   wherein the first flip-flop has simulation initialization value of "1" and a hardware initialization value of "0"; and
   further wherein the second flip-flop has a simulation initialization value of "0" and a hardware initialization value of "0".

21. An apparatus as recited in claim 20, wherein the protection circuitry further comprises:
   a third flip-flop initialized to a logical "1" and comprising:
      a clock input;
      a variable input connected to the output of the XOR gate; and
      an output.

22. An apparatus as recited in claim 13, wherein the protection circuitry comprises:
   a flip-flop comprising:
      a clock input;
      a variable input; and
      an output;
   wherein the output of the flip-flop is fed back to the variable input of the flip-flop; and
   further wherein an output of the flip-flop is the output of the protection circuitry.

23. An apparatus as recited in claim 13, wherein adding protection circuitry is performed automatically.

24. A computer program product comprising a machine readable medium on which is provided program instructions for producing a simulation version of an electronic design, which cannot be directly compiled to produce a correctly operating hardware implementation of the electronic design, the program instructions comprising:
   instructions for receiving an unprotected version of the electronic design suitable for direct compilation to a correctly operating hardware implementation of the electronic design; and
   instructions for adding protection circuitry to produce a protected version of the electronic design from which the simulation version is to be created,
   wherein the protection circuitry does not substantially impact the accuracy of a simulation result, but prevents a correctly operating implementation of the electronic design in a hardware environment.

25. A computer program product as recited in claim 24, wherein the unprotected version of the electronic design is provided in a HDL source format.

26. A computer program product as recited in claim 24, wherein the electronic design is a reusable IP core.

27. A computer program product as recited in claim 24, wherein the instructions for adding protection circuitry comprises:
   instructions for identifying a location for connecting the protection circuitry to the unprotected version of the electronic design; and
   instructions for connecting the protection circuitry to the unprotected version of the electronic design, thereby creating a protected version of the electronic design.

28. A computer program product as recited in claim 24, wherein the instructions for adding protection circuitry comprise instructions for performing at least one of the following steps:
   locating one or more existing AND gates and connecting an appropriate output of the protection circuitry to at least one located AND gate; or
   locating one or more existing OR gates and connecting an appropriate output of the protection circuitry to at least one located OR gate; or
   locating one or more existing random internal nets and connecting an appropriate output of the protection circuitry to at least one AND gate inserted to at least one located internal net; or
   locating one or more existing random internal nets and connecting an appropriate output of the protection circuitry to at least one OR gate inserted to at least one located internal net.

29. A computer program product as recited in claim 24, wherein the protection circuitry always outputs a simulation output value in a simulation environment and always outputs a hardware output value in a hardware environment, further wherein the simulation output value and hardware output value are different.

30. A computer program product as recited in claim 24, wherein the protection circuitry comprises a shift register.

31. A computer program product as recited in claim 24, wherein the protection circuitry comprises:
a first flip-flop comprising:
a clock input;
a variable input; and
an output;
a second flip-flop comprising:
a clock input;
a variable input; and
an output;
wherein the output of the first flip-flop is provided to the variable input of the second flip-flop and further wherein the output of the second flip-flop is provided to the variable input of the first flip-flop;
an XOR gate comprising:
a first input connected to the output of the first flip-flop;
a second input connected to the output of the second flip-flop; and
an output;
wherein the first flip-flop has simulation initialization value of "1" and a hardware initialization value of "0"; and
further wherein the second flip-flop has a simulation initialization value of "0" and a hardware initialization value of "0".

32. A computer program product as recited in claim 31, wherein the protection circuitry further comprises:
a third flip-flop initialized to a logical "1" and comprising:
a clock input;
a variable input connected to the output of the XOR gate; and
an output.

33. A computer program product as recited in claim 24, wherein the protection circuitry comprises:
a flip-flop comprising:
a clock input;
a variable input; and
an output;
wherein the output of the flip-flop is fed back to the variable input of the flip-flop; and
further wherein an output of the flip-flop is the output of the protection circuitry.

34. A protected electronic design comprising:
a programming version of the electronic design for insertion in user designed logic developed using a specified EDA platform; and
a simulation version of the electronic design for simulating operation of the electronic design in the designed logic, wherein the simulation version comprises protection circuitry absent in the programming version, further wherein the protection circuitry allows a hardware simulation result of the electronic design but prevents direct compilation to produce a correctly operating hardware implementation of the electronic design.

35. The protected electronic design of claim 34, wherein the protection circuitry always outputs a simulation output value in a simulation environment and always outputs a hardware output value in a hardware environment, further wherein the simulation output value and hardware output value are different.

36. The protected electronic design of claim 34, wherein the protection circuitry comprises a shift register.

37. The protected electronic design of claim 34, wherein the protection circuitry comprises:
a first flip-flop comprising:
a clock input;
a variable input; and
an output;
a second flip-flop comprising:
a clock input;
a variable input; and
an output;
wherein the output of the first flip-flop is provided to the variable input of the second flip-flop and further wherein the output of the second flip-flop is provided to the variable input of the first flip-flop;
an XOR gate comprising:
a first input connected to the output of the first flip-flop;
a second input connected to the output of the second flip-flop; and
an output;
wherein the first flip-flop has simulation initialization value of "1" and a hardware initialization value of "0"; and
further wherein the second flip-flop has a simulation initialization value of "0" and a hardware initialization value of "0".

38. The protected electronic design of claim 37, wherein the protection circuitry further comprises:
a third flip-flop initialized to a logical "1" and comprising:
a clock input;
a variable input connected to the output of the XOR gate; and
an output.

39. The protected electronic design of claim 34, wherein the protection circuitry comprises:
a flip-flop comprising:
a clock input;
a variable input; and
an output;
wherein the output of the flip-flop is fed back to the variable input of the flip-flop; and
further wherein an output of the flip-flop is the output of the protection circuitry.

40. The protected electronic design of claim 34, wherein the programming version of the electronic design is encrypted.

* * * * *